(12) United States Patent
Guo et al.

(10) Patent No.: US 12,371,365 B2
(45) Date of Patent: Jul. 29, 2025

(54) GLASS COMPOSITIONS WITH HIGH CENTRAL TENSION CAPABILITY

(71) Applicant: Corning Incorporated, Corning, NY (US)

(72) Inventors: Xiaoju Guo, Pittsford, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 984 days.

(21) Appl. No.: 17/358,961

(22) Filed: Jun. 25, 2021

(65) Prior Publication Data

US 2021/0403368 A1 Dec. 30, 2021

Related U.S. Application Data

(60) Provisional application No. 63/046,482, filed on Jun. 30, 2020.

(51) Int. Cl.
| | |
|---|---|
| *C03C 3/087* | (2006.01) |
| *C03C 3/091* | (2006.01) |
| *C03C 4/18* | (2006.01) |
| *C03C 21/00* | (2006.01) |

(52) U.S. Cl.
CPC .............. *C03C 3/087* (2013.01); *C03C 3/091* (2013.01); *C03C 4/18* (2013.01); *C03C 21/002* (2013.01); *C03C 2204/00* (2013.01)

(58) Field of Classification Search
None
See application file for complete search history.

(56) References Cited

U.S. PATENT DOCUMENTS

| 8,854,623 B2 | 10/2014 | Fontaine et al. | |
|---|---|---|---|
| 2015/0368148 A1* | 12/2015 | Duffy | C03C 21/002 |
| | | | 428/220 |
| 2016/0102011 A1 | 4/2016 | Hu et al. | |
| 2016/0102014 A1 | 4/2016 | Hu et al. | |
| 2017/0197876 A1* | 7/2017 | Oram | C03C 3/097 |

(Continued)

FOREIGN PATENT DOCUMENTS

WO 2021/108310 A1 6/2021

OTHER PUBLICATIONS

International Search Report and Written Opinion of the International Searching Authority; PCT/US2021/039344; dated Oct. 25, 2021; 12 pages; European Patent Office.

(Continued)

*Primary Examiner* — Jeffrey D Washville
(74) *Attorney, Agent, or Firm* — Travis B. Gasa; Russell S. Magaziner

(57) ABSTRACT

A glass composition is provided that is capable of being ion exchanged to produce high central tension values. The glass composition includes $SiO_2$, $Li_2O$, and CaO. Glass-based articles formed by ion-exchanging glass-based substrates formed from the glass composition are also provided. The glass-based articles are characterized by a maximum central tension of greater than or equal to 150 MPa, and this maximum central tension value may be achieved by ion exchanging in a sodium containing molten salt bath. The glass-based articles may be utilized in consumer electronic devices.

20 Claims, 2 Drawing Sheets

(56) References Cited

U.S. PATENT DOCUMENTS

2017/0305786 A1* 10/2017 Roussev ............... C03C 3/097
2019/0300422 A1 10/2019 Guo et al.
2019/0369672 A1 12/2019 Guo et al.
2020/0079689 A1 3/2020 Guo et al.

OTHER PUBLICATIONS

ASTM C829-81 (2015), titled "Standard Practice for Measurement of Liquidus Temperature of Glass by the Gradient Furnace Method".
ASTM C965-96 (2012), titled "Standard Practice for Measuring Viscosity of Glass Above the Softening Point".
ASTM E2001-13, titled "Standard Guide for Resonant Ultrasound Spectroscopy for Defect Detection in Both Metallic and Non-metallic Parts.".
ASTM standard C770-16, entitled "Standard Test Method for Measurement of Glass Stress-Optical Coefficient,".
Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, 1992, pp. 1-30.
Reddy, K.P.R. et al., "Fracture Toughness Measurement of Glass and Ceramic Materials Using Chevron-Notched Specimens," J. Am. Ceram. Soc., vol. 71, No. 6, 1988, pp. C-310-C-313.

* cited by examiner

GLASS COMPOSITIONS WITH HIGH CENTRAL TENSION CAPABILITY

This application claims the benefit of priority of U.S. Provisional Application Ser. No. 63/046,482 filed on Jun. 30, 2020, the content of which is relied upon and incorporated herein by reference in its entirety.

BACKGROUND

Field

The present specification generally relates to glass compositions suitable for use as cover glass for electronic devices. More specifically, the present specification is directed to aluminosilicate glasses that may be formed into cover glass for electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Glass can be made more resistant to flexure failure by the ion-exchange technique, which involves inducing compressive stress in the glass surface. However, the ion-exchanged glass will still be vulnerable to dynamic sharp contact, owing to the high stress concentration caused by local indentations in the glass from the sharp contact.

It has been a continuous effort for glass makers and handheld device manufacturers to improve the resistance of handheld devices to sharp contact failure. Solutions range from coatings on the cover glass to bezels that prevent the cover glass from impacting the hard surface directly when the device drops on the hard surface. However, due to the constraints of aesthetic and functional requirements, it is very difficult to completely prevent the cover glass from impacting the hard surface.

It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glasses that can be strengthened, such as by ion exchange, and that have the mechanical properties that allow them to be formed as thin glass articles.

SUMMARY

According to aspect (1), a glass-based article is provided. The glass-based article included: a compressive stress region extending from a surface to a depth of compression; a maximum central tension of greater than or equal to 150 MPa; a composition at a center of the glass-based article comprising: greater than or equal to 30 mol % $SiO_2$; greater than or equal to 10 mol % to less than or equal to 25 mol % $Li_2O$; greater than or equal to 0 mol % to less than or equal to 17 mol % CaO; greater than or equal to 0 mol % to less than or equal to 3 mol % $K_2O$; and greater than or equal to 0 mol % to less than or equal to 14 mol % $B_2O_3$. According to aspect (2), the glass-based article of aspect (1) is provided, wherein the composition at the center comprises greater than or equal to 0 mol % to less than or equal to 11 mol % $B_2O_3$.

According to aspect (3), the glass-based article of aspect (1) or (2) is provided, wherein the composition at the center comprises at least one of: less than or equal to 57.5 mol % $SiO_2$; greater than or equal to 1 mol % SrO; and greater than 0 mol % to less than or equal to 5 mol % $B_2O_3$.

According to aspect (4), the glass-based article of any of aspects (1) to (3) is provided, wherein the composition at the center is characterized by $SiO_2+B_2O_3+Al_2O_3+CaO+SrO+Li_2O+Na_2O+K_2O$ being greater than or equal to 99.7 mol %.

According to aspect (5), the glass-based article of any of aspects (1) to (4) is provided, wherein the maximum central tension is greater than or equal to 200 MPa.

According to aspect (6), the glass-based article of any of aspects (1) to (5) is provided, wherein the maximum central tension is greater than or equal to 300 MPa.

According to aspect (7), the glass-based article of any of aspects (1) to (6) is provided, comprising a compressive stress of greater than or equal to 500 MPa.

According to aspect (8), the glass-based article of any of aspects (1) to (7) is provided, wherein the depth of compression is greater than or equal to 0.15t, wherein t is a thickness of the glass-based article.

According to aspect (9), the glass-based article of any of aspects (1) to (8) is provided, comprising a parabolic stress profile.

According to aspect (10), a consumer electronic product is provided. The consumer electronic product includes: a housing comprising a front surface, a back surface and side surfaces; electrical components at least partially within the housing, the electrical components comprising a controller, a memory, and a display, the display at or adjacent the front surface of the housing; and a cover disposed over the display, wherein at least a portion of at least one of the housing or the cover comprises the glass-based article of any of aspects (1) to (9).

According to aspect (11), a method is provided. The method includes: contacting a glass-based substrate with an ion exchange salt to form a glass-based article; wherein: the glass-based article comprises a compressive stress region extending from a surface to a depth of compression and a maximum central tension of greater than or equal to 150 MPa; the ion exchange salt comprises sodium; and the glass-based substrate comprises: greater than or equal to 30 mol % $SiO_2$; greater than or equal to 10 mol % to less than or equal to 25 mol % $Li_2O$; greater than or equal to 0 mol % to less than or equal to 17 mol % CaO; greater than or equal to 0 mol % to less than or equal to 3 mol % $K_2O$; and greater than or equal to 0 mol % to less than or equal to 14 mol % $B_2O_3$.

According to aspect (12), the method of aspect (11) is provided, wherein the glass-based substrate comprises greater than or equal to 0 mol % to less than or equal to 11 mol % $B_2O_3$.

According to aspect (13), the method of aspect (11) or (12) is provided, wherein the glass-based substrate comprises at least one of: less than or equal to 57.5 mol % $SiO_2$; greater than or equal to 1 mol % SrO; and greater than 0 mol % to less than or equal to 5 mol % $B_2O_3$.

According to aspect (14), the method of any of aspects (11) to (13) is provided, wherein the glass-based substrate is characterized by $SiO_2+B_2O_3+Al_2O_3+CaO+SrO+Li_2O+Na_2O+K_2O$ being greater than or equal to 99.7 mol %.

According to aspect (15), the method of any of aspects (11) to (14) is provided, wherein the maximum central tension is greater than or equal to 200 MPa.

According to aspect (16), the method of any of aspects (11) to (15) is provided, wherein the maximum central tension is greater than or equal to 300 MPa.

According to aspect (17), the method of any of aspects (11) to (16) is provided, wherein the compressive stress region comprises a compressive stress of greater than or equal to 500 MPa.

According to aspect (18), the method of any of aspects (11) to (17) is provided, wherein the depth of compression is greater than or equal to 0.15t, wherein t is a thickness of the glass-based article.

According to aspect (19), the method of any of aspects (11) to (18) is provided, wherein the glass-based article comprises a parabolic stress profile.

According to aspect (20), the method of any of aspects (11) to (19) is provided, wherein the ion exchange salt comprises $NaNO_3$.

According to aspect (21), the method of any of aspects (11) to (20) is provided, wherein the ion exchange salt comprises 100 wt % $NaNO_3$.

According to aspect (22), the method of any of aspects (11) to (20) is provided, wherein the ion exchange salt is a molten salt bath at a temperature of greater than or equal to 380° C. to less than or equal to 480° C.

According to aspect (23), the method of any of aspects (11) to (21) is provided, wherein the contacting extends for a time period of less than or equal to 16 hours.

According to aspect (24), a glass is provided. The glass includes: greater than or equal to 30 mol % $SiO_2$; greater than or equal to 10 mol % to less than or equal to 25 mol % $Li_2O$; greater than or equal to 0.5 mol % to less than or equal to 17 mol % CaO; greater than or equal to 0 mol % to less than or equal to 3 mol % $K_2O$; greater than or equal to 0 mol % to less than or equal to 11 mol % $B_2O_3$; and at least one of: less than or equal to 57.5 mol % $SiO_2$; greater than or equal to 1 mol % SrO; and greater than 0 mol % to less than or equal to 5 mol % $B_2O_3$; wherein $SiO_2+B_2O_3+Al_2O_3+CaO+SrO+Li_2O+Na_2O+K_2O$ is greater than or equal to 99.7 mol %.

According to aspect (25), the glass of aspect (24) is provided, comprising less than or equal to 57.5 mol % $SiO_2$.

According to aspect (26), the glass of aspect (24) or (25) is provided, comprising greater than or equal to 1 mol % SrO.

According to aspect (27), the glass of any of aspects (24) to (26) is provided, comprising greater than 0 mol % to less than or equal to 5 mol % $B_2O_3$.

According to aspect (28), the glass of any of aspects (24) to (27) is provided, comprising greater than or equal to 43 mol % to less than or equal to 65 mol % $SiO_2$.

According to aspect (29), the glass of any of aspects (24) to (28) is provided, comprising greater than or equal to 15 mol % to less than or equal to 26 mol % $Al_2O_3$.

According to aspect (30), the glass of any of aspects (24) to (29) is provided, comprising greater than or equal to 0 mol % to less than or equal to 14 mol % MgO.

According to aspect (31), the glass of any of aspects (24) to (30) is provided, comprising greater than or equal to 0 mol % to less than or equal to 10 mol % SrO.

According to aspect (32), the glass of any of aspects (24) to (31) is provided, comprising greater than or equal to 0 mol % to less than or equal to 5 mol % BaO.

According to aspect (33), the glass of any of aspects (24) to (32) is provided, comprising greater than or equal to 10 mol % to less than or equal to 24 mol % $Li_2O$.

According to aspect (34), the glass of any of aspects (24) to (33) is provided, comprising greater than or equal to 0.5 mol % to less than or equal to 9 mol % $Na_2O$.

According to aspect (35), the glass of any of aspects (24) to (34) is provided, comprising greater than or equal to 0 mol % to less than or equal to 1 mol % $K_2O$.

According to aspect (36), the glass of any of aspects (24) to (35) is provided, comprising greater than or equal to 0 mol % to less than or equal to 1 mol % $TiO_2$.

According to aspect (37), the glass of any of aspects (24) to (36) is provided, wherein the glass has a fracture toughness of greater than or equal to 0.75 MPa√m.

According to aspect (38), the glass of any of aspects (24) to (37) is provided, wherein the glass has a Young's modulus of greater than or equal to 80 GPa.

According to aspect (39), the glass of any of aspects (24) to (38) is provided, wherein the glass exhibits a maximum central tension of greater than or equal to 150 MPa when ion exchanged in a 100 wt % $NaNO_3$ molten salt bath for a time period of less than or equal to 16 hours.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
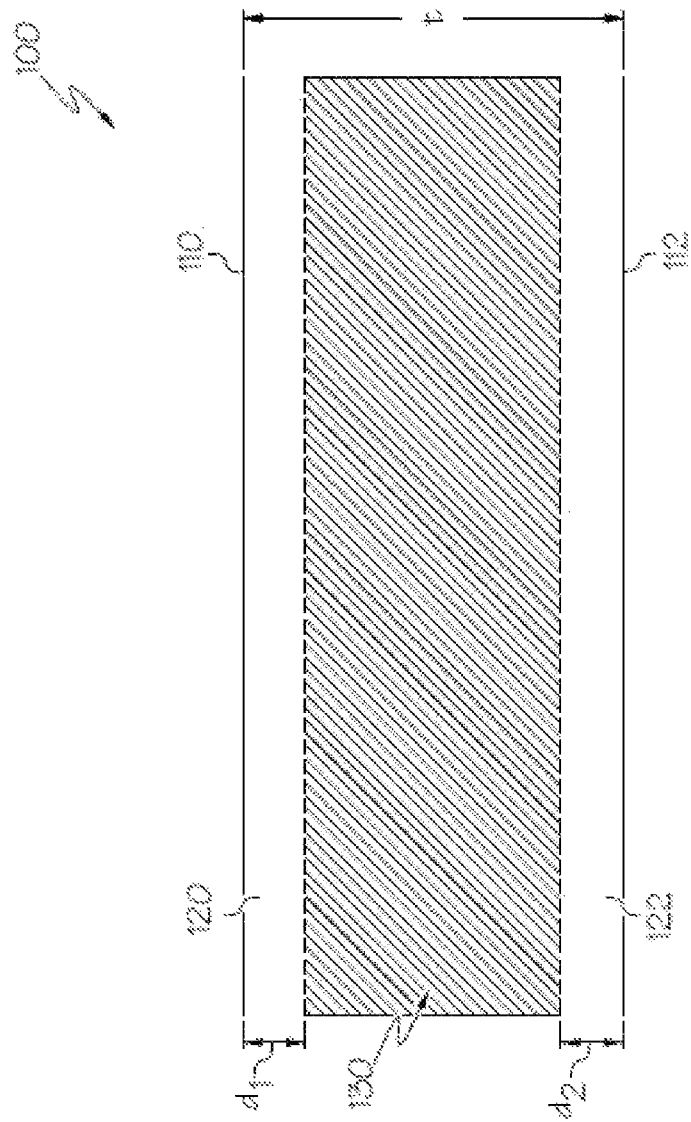
FIG. 1 schematically depicts a cross section of a glass having compressive stress layers on surfaces thereof according to embodiments disclosed and described herein.

Reference will now be made in detail to lithium aluminosilicate glasses according to various embodiments.

Lithium aluminosilicate glasses have good ion exchangeability, and chemical strengthening processes have been used to achieve high strength and high toughness properties in lithium aluminosilicate glasses. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles.

Therefore, lithium aluminosilicate glasses with good physical properties, chemical durability, and ion exchangeability have drawn attention for use as cover glass. In particular, lithium containing aluminosilicate glasses which have the ability to be ion exchanged to high central tension values, are provided herein. A common failure mode for cover glass is a drop on to a rough surface, and the amount of stored energy in an ion exchanged glass article is positively correlated to fracture resistance when dropped on a rough surface. The amount of stored energy may be characterized by the maximum central tension (CT) value of the ion exchanged glass article, with higher CT values indicating higher amounts of stored energy. At high stored energies, and thereby CT values, the glass articles may be rendered frangible. However, if the frangible behavior is properly controlled such that it does not pose a risk to the user, glass articles with high CT values and improved mechanical performance may be produced. The glass compositions described herein are capable of forming ion exchanged glass articles with high CT values and stored energies that exhibit highly frangible behavior and improved mechanical performance. The high CT values, greater than or equal to 150 MPa, of the glass articles described herein allow the glass articles to perform better in repeated drops and on rough surface drops than existing glass articles with lower CT values, while exhibiting similar smooth surface drop performance.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. Components of the lithium aluminosilicate glass composition according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits.

As utilized herein, a "glass substrate" refers to a glass piece that has not been ion exchanged. Similarly, a "glass article" refers to a glass piece that has been ion exchanged and is formed by subjecting a glass substrate to an ion exchange process. A "glass-based substrate" and a "glass-based article" are defined accordingly and include glass substrates and glass articles as well as substrates and articles that are made wholly or partly of glass, such as glass substrates that include a surface coating. While glass substrates and glass articles are generally referred to herein for the sake of convenience, the descriptions of glass substrates and glass articles should be understood to apply equally to glass-based substrates and glass-based articles.

Disclosed herein are lithium aluminosilicate glass compositions that exhibit a high central tension capability when ion exchanged under appropriate conditions.

In embodiments of the alkali aluminosilicate glass compositions disclosed herein, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In embodiments, the glass composition comprises $SiO_2$ in amounts greater than or equal to 30.0 mol %, such as greater than or equal to 31.0 mol %, greater than or equal to 32.0 mol %, greater than or equal to 33.0 mol %, greater than or equal to 34.0 mol %, greater than or equal to 35.0 mol %, greater than or equal to 36.0 mol %, greater than or equal to 37.0 mol %, greater than or equal to 38.0 mol %, greater than or equal to 39.0 mol %, greater than or equal to 40.0 mol %, greater than or equal to 41.0 mol %, greater than or equal to 42.0 mol %, greater than or equal to 43.0 mol %, greater than or equal to 44.0 mol %, greater than or equal to 45.0 mol %, greater than or equal to 46.0 mol %, greater than or equal to 47.0 mol %, greater than or equal to 48.0 mol %, greater than or equal to 49.0 mol %, greater than or equal to 50.0 mol %, greater than or equal to 51.0 mol %, greater than or equal to 52.0 mol %, greater than or equal to 53.0 mol %, greater than or equal to 54.0 mol %, greater than or equal to 55.0 mol %, greater than or equal to 56.0 mol %, or greater than or equal to 57.0 mol %. In embodiments, the glass composition comprises $SiO_2$ in amounts less than or equal to 57.5 mol %, such as less than or equal to 57.0 mol %, less than or equal to 56.0 mol %, less than or equal to 55.0 mol %, less than or equal to 54.0 mol %, less than or equal to 53.0 mol %, less than or equal to 52.0 mol %, less than or equal to 51.0 mol %, less than or equal to 50.0 mol %, less than or equal to 49.0 mol %, less than or equal to 48.0 mol %, less than or equal to 47.0 mol %, less than or equal to 46.0 mol %, less than or equal to 45.0 mol %, less than or equal to 44.0 mol %, less than or equal to 43.0 mol %, less than or equal to 42.0 mol %, less than or equal to 41.0 mol %, less than or equal to 40.0 mol %, less than or equal to 39.0 mol %, less than or equal to 38.0 mol % less than or equal to 37.0 mol %, less than or equal to 36.0 mol %, less than or equal to 35.0 mol %, less than or equal to 34.0 mol %, less than or equal to 33.0 mol %, less than or equal to 32.0 mol %, or less than or equal to 31.0 mol %. It should be understood that, in embodiments, any of the above ranges may be combined with any other range, such that the glass composition comprises $SiO_2$ in an amount from greater than or equal to 30.0 mol % to less than or equal to 57.5 mol %, such as from greater than or equal to 31.0 mol % to less than or equal to 57.0 mol %, from greater than or equal to 32.0 mol % to less than or equal to 56.0 mol %, from greater than or equal to 33.0 mol % to less than or equal to 55.0 mol %, from greater than or equal to 34.0 mol % to less than or equal to 54.0 mol %, from greater than or equal to 35.0 mol % to less than or equal to 53.0 mol %, from greater than or equal to 36.0 mol % to less than or equal to 52.0 mol %, from greater than or equal to 37.0 mol % to less than or equal to 51.0 mol %, from greater than or equal to 38.0 mol % to less than or equal to 50.0 mol %, from greater than or equal to 39.0 mol % to less than or equal to 49.0 mol %, from greater than or equal to 40.0 mol % to less than or equal to 48.0 mol %, from greater than or equal to 41.0 mol % to less than or equal to 47.0 mol %, from greater than or equal to 42.0 mol % to less than or equal to 46.0 mol %, from greater than or equal to 43.0 mol % to less than or equal to 45.0 mol %, from greater than or equal to 43.0 mol % to less than or equal to 44.0 mol %, from greater than or equal to 43.0 mol % to less than or equal to 65.0 mol %, and all ranges and sub-ranges between the foregoing values.

The glass composition of embodiments includes $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes. The inclusion of $Al_2O_3$ in the glass compositions enables high fracture toughness values and increases the amount of stress imparted by ion exchange. In embodiments, the glass composition comprises $Al_2O_3$ in amounts greater than 15 mol %, such as greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, greater than or equal to 24.5 mol %, greater than or equal to 25.0 mol %, or greater than or equal to 25.5 mol %. In embodiments, the glass composition comprises $Al_2O_3$ in amounts less than or equal to 26 mol %, such as less than or equal to 25.5 mol %, less than or equal to 25.0 mol %, less than or equal to 24.5 mol %, less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, or less than or equal to 15.5 mol %. It should be understood that, in embodiments, any of the above ranges may be combined with any other range, such that the glass composition comprises $Al_2O_3$ in an amount from greater than 15 mol % to less than or equal to 32 mol %, such as from greater than or equal to 15.0 mol % to less than or equal to 26.0 mol %, from greater than or equal to 15.5 mol % to less than or equal to 25.5 mol %, from greater than or equal to 16.0 mol % to less than or equal to 25.0 mol %, from greater than or equal to 16.5 mol % to less than or equal to 24.5 mol %, from greater than or equal to 17.0 mol % to less than or equal to 24.0 mol %, from greater than or equal to 17.5 mol % to less than or equal to 23.5 mol %, from greater than or equal to 18.0 mol % to less than or equal to 23.0 mol %, from greater than or equal to 18.5 mol % to less than or equal to 22.5 mol %, from greater than or equal to 19.0 mol % to less than or equal to 22.0 mol %, from greater than or equal to 19.5 mol % to less than or equal to 21.5 mol %, from greater than or equal to 20.0 mol % to less than or equal to 21.0 mol %, from greater than or equal to 20.5 mol % to less than or equal to 21.0 mol %, and all ranges and sub-ranges between the foregoing values.

Like $SiO_2$ and $Al_2O_3$, $B_2O_3$ may be added to the glass composition as a network former, thereby improving the glass forming range and manufacturability (via liquidus reduction) of the glass composition. The inclusion of $B_2O_3$ in the glass compositions enables high fracture toughness values. In embodiments, the glass composition may comprise $B_2O_3$ in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, or greater than or equal to 13.5 mol %. In embodiments, the glass composition may comprise $B_2O_3$ in an amount less than or equal to 14.0 mol %, such as less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises $B_2O_3$ in amounts from greater than or equal to 0 mol % to less than or equal to 14.0 mol %, such as greater than 0 mol % to less than or equal to 13.5 mol %, greater than or equal to 0.5 mol % to less than or equal to 13.0 mol %, greater than or equal to 1.0 mol % to less than or equal to 12.5 mol %, greater than or equal to 1.5 mol % to less than or equal to 12.0 mol %, greater than or equal to 2.0 mol % to less than or equal to 11.5 mol %, greater than or equal to 2.5 mol % to less than or equal to 11.0 mol %, greater than or equal to 3.0 mol % to less than or equal to 10.5 mol %, greater than or equal to 3.5 mol % to less than or equal to 10.0 mol %, greater than or equal to 4.0 mol % to less than or equal to 9.5 mol %, greater than or equal to 4.5 mol % to less than or equal to 9.0 mol %, greater than or equal to 5.0 mol % to less than or equal to 8.5 mol %, greater than or equal to 5.5 mol % to less than or equal to 8.0 mol %, greater than or equal to 6.0 mol % to less than or equal to 7.5 mol %, greater than or equal to 6.5 mol % to less than or equal to 7.0 mol %, greater than or equal to 0 mol % to less than or equal to 11.0 mol %, and all ranges and sub-ranges between the foregoing values. In embodiments, the glass composition may comprise $B_2O_3$ in amounts from greater than 0 mol % to less than or equal to 5 mol %. In embodiments, the glass composition may be substantially free or free of $B_2O_3$.

The inclusion of $Li_2O$ in the glass composition allows for better control of an ion exchange process and further reduces the softening point of the glass, thereby increasing the manufacturability of the glass. The presence of $Li_2O$ in the glass compositions also allows the formation of a stress profile with a parabolic shape. In embodiments, the glass composition comprises $Li_2O$ in amounts greater than or equal to 10.0 mol %, such as greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, or greater than or equal to 24.5 mol %. In embodiments, the glass composition comprises $Li_2O$ in amounts less than or equal to 25.0 mol %, such as less than or equal to 24.5 mol %, less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, or less than or equal to 4.5 mol %. It should be understood that, in embodiments, any of the above ranges may be combined with any other range, such that the glass composition comprises $Li_2O$ in an amount from greater than or equal to 10.0 mol % to less than or equal to 25.0 mol %, such as from greater than or equal to 10.5 mol % to less than or equal to 24.5 mol %, from greater than or equal to 11.0 mol % to less than or equal to 24.0 mol %, from greater than or equal to 11.5 mol % to less than or equal to 23.5 mol %, from greater than or equal to 12.0 mol % to less than or equal to 23.0 mol %, from greater than or equal to 12.5 mol % to less than or equal to 22.5 mol %, from greater than or equal to 13.0 mol % to less than or equal to 22.0 mol %, from greater than or equal to 13.5 mol % to less than or equal to 21.5 mol %, from greater than or equal to 14.0 mol % to less than or equal to 21.0 mol %, from greater than or equal to 14.5 mol % to less than or equal to 20.5 mol %, from greater than or equal to 15.0 mol % to less than or equal to 20.0 mol %, from greater than or equal to 15.5 mol % to less than or equal to 19.5 mol %, from greater than or equal to 16.0 mol % to less than or equal to 19.0 mol %, from greater than or equal to 16.5 mol % to less than or equal to 18.5 mol %, from greater than or equal to 17.0 mol % to less than or equal to 18.0 mol %, from greater than or equal to 17.0 mol % to less than or equal to 17.5 mol %, and all ranges and sub-ranges between the foregoing values.

According to embodiments, the glass composition may also include $Na_2O$. $Na_2O$ aids in the ion exchangeability of the glass composition, and also improves the formability, and thereby manufacturability, of the glass composition. However, if too much $Na_2O$ is added to the glass composition, the coefficient of thermal expansion (CTE) may be too low, and the melting point may be too high. The inclusion of $Na_2O$ in the glass compositions also enables high compressive stress values to be achieved through ion exchange strengthening. In embodiments, the glass composition comprises $Na_2O$ in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, or greater than or equal to 8.5 mol %. In embodiments, the glass composition comprises $Na_2O$ in amounts less than or equal to 9.0 mol %, such as less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, or less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises $Na_2O$ in an amount from greater than or equal to 0 mol % to less than or equal to 9.0 mol %, such as from greater than 0 mol % to less than or equal to 9.0 mol %, from greater than or equal to 0.5 mol % to less than or equal to 9.0 mol %, from greater than or equal to 1.0 mol % to less than or equal to 8.5 mol %, from greater than or equal to 1.5 mol % to less than or equal to 8.0 mol %, from greater than or equal to 2.0 mol % to less than or equal to 7.5 mol %, from greater than or equal to 2.5 mol % to less than or equal to 7.0 mol %, from greater than or equal to 3.0 mol % to less than or equal to 6.5 mol %, from greater than or equal to 3.5 mol % to less than or equal to 6.0 mol %, from greater than or equal to 4.0 mol % to less than or equal to 5.5 mol %, from greater than or equal to 4.5 mol % to less than or equal to 5.0 mol %, and all ranges and sub-ranges between the foregoing values.

Like $Na_2O$, $K_2O$ also promotes ion exchange and increases the depth of compression (DOC) of a compressive stress layer formed as a result. However, adding $K_2O$ may cause the CTE to be too low, and the melting point to be too high. The glass composition includes $K_2O$. The inclusion of $K_2O$ in the glass composition enables a deep depth of a high compressive stress spike in the glass articles produced by ion exchange. In embodiments, the glass composition may contain $K_2O$ in an amount of less than or equal to 3.0 mol %, such as less than or equal to 2.9 mol %, less than or equal to 2.8 mol %, less than or equal to 2.7 mol %, less than or equal to 2.6 mol %, less than or equal to 2.5 mol %, less than or equal to 2.4 mol %, less than or equal to 2.3 mol %, less than or equal to 2.2 mol %, less than or equal to 2.1 mol %, less than or equal to 2.0 mol %, less than or equal to 1.9 mol %, less than or equal to 1.8 mol %, less than or equal to 1.7 mol %, less than or equal to 1.6 mol %, less than or equal to 1.5 mol %, less than or equal to 1.4 mol %, less than or equal to 1.3 mol %, less than or equal to 1.2 mol %, less than or equal to 1.1 mol %, less than or equal to 1.0 mol %, less than or equal to 0.9 mol %, less than or equal to 0.8 mol %, less than or equal to 0.7 mol %, less than or equal to 0.6 mol %, less than or equal to 0.5 mol %, less than or equal to 0.4 mol %, less than or equal to 0.3 mol %, less than or equal to 0.2 mol %, or less than or equal to 0.1 mol %. In embodiments, the glass composition may contain $K_2O$ in an amount of greater than or equal to 0 mol %, such as greater than 0 mol %, greater than or equal to 0.1 mol %, greater than or equal to 0.2 mol %, greater than or equal to 0.3 mol %, greater than or equal to 0.4 mol %, greater than or equal to 0.5 mol %, greater than or equal to 0.6 mol %, greater than or equal to 0.7 mol %, greater than or equal to 0.8 mol %, greater than or equal to 0.9 mol %, greater than or equal to 1.0 mol %, greater than or equal to 1.1 mol %, greater than or equal to 1.2 mol %, greater than or equal to 1.3 mol %, greater than or equal to 1.4 mol %, greater than or equal to 1.5 mol %, greater than or equal to 1.6 mol %, greater than or equal to 1.7 mol %, greater than or equal to 1.8 mol %, greater than or equal to 1.9 mol %, greater than or equal to 2.0 mol %, greater than or equal to 2.1 mol %, greater than or equal to 2.2 mol %, greater than or equal to 2.3 mol %, greater than or equal to 2.4 mol %, greater than or equal to 2.5 mol %, greater than or equal to 2.6 mol %, greater than or equal to 2.7 mol %, greater than or equal to 2.8 mol %, or greater than or equal to 2.9 mol %. It should be understood that, in embodiments, any of the above ranges may be combined with any other range, such that the glass composition comprises $K_2O$ in an amount from greater than or equal to 0 mol % to less than or equal to 3.0 mol %, such as from greater than or equal to 0 mol % to less than or equal to 1.0 mol %, from greater than or equal to 0.1 mol % to less than or equal to 2.9 mol %, from greater than or equal to 0.2 mol % to less than or equal to 2.8 mol %, from greater than or equal to 0.3 mol % to less than or equal to 2.7 mol %, from greater than or equal to 0.4 mol % to less than or equal to 2.6 mol %, from greater than or equal to 0.5 mol % to less than or equal to 2.5 mol %, from greater than or equal to 0.6 mol % to less than or equal to 2.4 mol %, from greater than or equal to 0.7 mol % to less than or equal to 2.3 mol %, from greater than or equal to 0.8 mol % to less than or equal to 2.2 mol %, from greater than or equal to 0.9 mol % to less than or equal to 2.1 mol %, from greater than or equal to 1.0 mol % to less than or equal to 2.0 mol %, from greater than or equal to 1.1 mol % to less than or equal to 1.9 mol %, from greater than or equal to 1.2 mol % to less than or equal to 1.8 mol %, from greater than or equal to 1.3 mol % to less than or equal to 1.7 mol %, from greater than or equal to 1.4 mol % to less than or equal to 1.6 mol %, from greater than or equal to 1.5 mol % to less than or equal to 1.6 mol %, and all ranges and sub-ranges between the foregoing values.

The glasses may include magnesium. The inclusion of MgO lowers the viscosity of the glass, which may enhance the formability and manufacturability of the glass. The inclusion of MgO in the glass composition also improves the strain point and the Young's modulus of the glass composition and improves the ability of the glass to achieve high compressive stress through ion exchange. However, when too much MgO is added to the glass composition, the density and the CTE of the glass composition increase undesirably. In embodiments, the glass composition comprises MgO in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, or greater than or equal to 13.5 mol %. In some embodiments, the glass composition comprises MgO in amounts less than or equal to 14 mol %, such as less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises MgO in an amount from greater than or equal to 0 mol % to less than or equal to 14 mol %, such as from greater than 0 mol % to less than or equal to 14.0 mol %, from greater than or equal to 0.5 mol % to less than or equal to 13.5 mol %, from greater than or equal to 1.0 mol % to less than or equal to 13.0 mol %, from greater than or equal to 1.5 mol % to less than or equal to 12.5 mol %, from greater than or equal to 2.0 mol % to less than or equal to 12.0 mol %, from greater than or equal to 2.5 mol % to less than or equal to 11.5 mol %, from greater than or equal to 3.0 mol % to less than or equal to 11.0 mol %, from greater than or equal to 3.5 mol % to less than or equal to 10.5 mol %, from greater than or equal to 4.0 mol % to less than or equal to 10.0 mol %, from greater than or equal to 4.5 mol % to less than or equal to 9.5 mol %, from greater than or equal to 5.0 mol % to less than or equal to 9.0 mol %, from greater than or equal to 5.5 mol % to less than or equal to 8.5 mol %, from greater than or equal to 6.0 mol % to less than or equal to 8.0 mol %, from greater than or equal to 6.5 mol % to less than or equal to 7.5 mol %, from greater than or equal to 7.0 mol % to less than or equal to 8.0 mol %, and all ranges and sub-ranges between the foregoing values. In embodiments, the glass composition may be substantially free or free of MgO.

The glass compositions may include CaO. The inclusion of CaO lowers the viscosity of the glass, which enhances the formability, the strain point and the Young's modulus, and improves the ability of the glass to achieve high compressive stress through ion exchange. However, when too much CaO is added to the glass composition, the density and the CTE of the glass composition increase. In embodiments, the glass composition comprises CaO in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol % greater than or equal to 16.0 mol %, or greater than or equal to 16.5 mol %. In embodiments, the glass composition comprises CaO in amounts less than or equal to 16.0 mol %, such as less than or equal to 15.5 mol %, less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises CaO in an amount from greater than or equal to 0 mol % to less than or equal to 16.0 mol %, such as from greater than 0 mol % to less than or equal to 15.5 mol %, from greater than or equal to 0.5 mol % to less than or equal to 15.0 mol %, from greater than or equal to 1.0 mol % to less than or equal to 14.5 mol %, from greater than or equal to 1.5 mol % to less than or equal to 14.0 mol %, from greater than or equal to 2.0 mol % to less than or equal to 13.5 mol %, from greater than or equal to 2.5 mol % to less than or equal to 13.0 mol %, from greater than or equal to 3.0 mol % to less than or equal to 12.5 mol %, from greater than or equal to 3.5 mol % to less than or equal to 12.0 mol %, from greater than or equal to 4.0 mol % to less than or equal to 11.5 mol %, from greater than or equal to 4.5 mol % to less than or equal to 11.0 mol %, from greater than or equal to 5.0 mol % to less than or equal to 10.5 mol %, from greater than or equal to 5.5 mol % to less than or equal to 10.0 mol %, from greater than or equal to 6.0 mol % to less than or equal to 9.5 mol %, from greater than or equal to 6.5 mol % to less than or equal to 9.0 mol %, from greater than or equal to 7.0 mol % to less than or equal to 8.5 mol %, from greater than or equal to 7.5 mol % to less than or equal to 8.0 mol %, and all ranges and sub-ranges between the foregoing values. In embodiments, the glass composition may be substantially free or free of CaO.

The glass compositions may include SrO. The inclusion of SrO lowers the viscosity of the glass, which enhances the formability, the strain point and the Young's modulus, and improves the ability of the glass to achieve high compressive stress through ion exchange. However, when too much SrO is added to the glass composition, the density and the CTE of the glass composition increase. In embodiments, the glass composition comprises SrO in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, or greater than or equal to 9.5 mol %. In embodiments, the glass composition comprises SrO in amounts less than or equal to 10.0 mol %, such as less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises SrO in an amount from greater than or equal to 0 mol % to less than or equal to 10.0 mol %, such as from greater than 0 mol % to less than or equal to 9.5 mol %, from greater than or equal to 0.5 mol % to less than or equal to 9.0 mol %, from greater than or equal to 1.0 mol % to less than or equal to 8.5 mol %, from greater than or equal to 1.5 mol % to less than or equal to 8.0 mol %, from greater than or equal to 2.0 mol % to less than or equal to 7.5 mol %, from greater than or equal to 2.5 mol % to less than or equal to 7.0 mol %, from greater than or equal to 3.0 mol % to less than or equal to 6.5 mol %, from greater than or equal to 3.5 mol % to less than or equal to 6.0 mol %, from greater than or equal to 4.0 mol % to less than or equal to 5.5 mol %, from greater than or equal to 4.5 mol % to less than or equal to 5.0 mol %, and all ranges and sub-ranges between the foregoing values. In embodiments, the glass composition comprises SrO in amounts greater than or equal to 1 mol %. In embodiments, the glass composition may be substantially free or free of SrO.

The glass compositions may include BaO. The inclusion of BaO lowers the viscosity of the glass, which enhances the formability, the strain point and the Young's modulus, and improves the ability of the glass to achieve high compressive stress through ion exchange. However, when too much BaO is added to the glass composition, the density and the CTE of the glass composition increase. In embodiments, the glass composition comprises BaO in amounts greater than or equal to 0 mol %, such as greater than 0 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, or greater than or equal to 4.5 mol %. In embodiments, the glass composition comprises BaO in amounts less than or equal to 5.0 mol %, such as less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises BaO in an amount from greater than or equal to 0 mol % to less than or equal to 5.0 mol %, such as from greater than 0 mol % to less than or equal to 4.5 mol %, from greater than or equal to 0.5 mol % to less than or equal to 4.0 mol %, from greater than or equal to 1.0 mol % to less than or equal to 3.5 mol %, from greater than or equal to 1.5 mol % to less than or equal to 3.0 mol %, from greater than or equal to 2.0 mol % to less than or equal to 2.5 mol %, and all ranges and sub-ranges between the foregoing values. In embodiments, the glass composition may be substantially free or free of BaO.

The glass compositions may include $TiO_2$. In embodiments, the glass composition may be substantially free or free of $TiO_2$. As used herein, the term "substantially free" means that the component is not added as a component of the batch material even though the component may be present in the final glass in very small amounts as a contaminant, such as less than 0.01 mol %. In embodiments, the glass compositions include $TiO_2$ in an amount from greater than or equal to 0 mol % to less than or equal to 1.0 mol %, such as from greater than 0 mol % to less than or equal to 0.9 mol %, from greater than or equal to 0.1 mol % to less than or equal to 0.8 mol %, from greater than or equal to 0.2 mol % to less than or equal to 0.7 mol %, from greater than or equal to 0.3 mol % to less than or equal to 0.6 mol %, from greater than or equal to 0.4 mol % to less than or equal to 0.5 mol %, and all ranges and sub-ranges between the foregoing values. The inclusion of too much $TiO_2$ in the glass composition may result in the glass being susceptible to devitrification and/or exhibiting an undesirable coloration.

In embodiments, the glass composition may be substantially free or free of $P_2O_5$. The inclusion of $P_2O_5$ in the glass composition may undesirably reduce the meltability and formability of the glass composition, thereby impairing the manufacturability of the glass composition. It is not necessary to include $P_2O_5$ in the glass compositions described herein to achieve the desired ion exchange performance. For this reason, $P_2O_5$ may be excluded from the glass composition to avoid negatively impacting the manufacturability of the glass composition while maintaining the desired ion exchange performance.

In embodiments, the glass composition may optionally include one or more fining agents. In some embodiments, the fining agents may include, for example, $SnO_2$. In such embodiments, $SnO_2$ may be present in the glass composition in an amount less than or equal to 0.2 mol %, such as from greater than or equal to 0 mol % to less than or equal to 0.2 mol %, from greater than or equal to 0 mol % to less than or equal to 0.1 mol %, from greater than or equal to 0 mol % to less than or equal to 0.05 mol %, from greater than or equal to 0.1 mol % to less than or equal to 0.2 mol %, and all ranges and sub-ranges between the foregoing values. In some embodiments, the glass composition may be substantially free or free of $SnO_2$.

In embodiments, the glass composition may be substantially free of one or both of arsenic and antimony. In other embodiments, the glass composition may be free of one or both of arsenic and antimony.

In embodiments, the glass composition may be substantially free or free of $Fe_2O_3$. Iron is often present in raw materials utilized to form glass compositions, and as a result may be detectable in the glass compositions described herein even when not actively added to the glass batch.

In addition to the above individual components, glass compositions according to embodiments disclosed herein may be characterized by the total amount of $SiO_2$, $B_2O_3$, $Al_2O_3$, CaO, SrO, $Li_2O$, $Na_2O$, and $K_2O$ contained therein. In embodiments, the glass composition may comprise $SiO_2$+$B_2O_3$+$Al_2O_3$+CaO+SrO+$Li_2O$+$Na_2O$+$K_2O$ in a concentration greater than or equal to 99.7 mol %, such as greater than or equal to 99.8 mol %, greater than or equal to 99.9 mol %, or 100%. Maintaining the total amount of these components in the desired ranges helps to achieve the desired properties of the glass composition.

The glass composition may be characterized by exhibiting one or more of a combination of compositional features. In embodiments, the glass composition may be characterized by at least one of: $SiO_2$ in an amount less than or equal to 57.5 mol %, SrO in amounts greater than or equal to 1 mol %, and/or $B_2O_3$ in amounts from greater than 0 mol % to less than or equal to 5 mol %. The glass composition may contain $SiO_2$ in an amount less than or equal to 57.5 mol %, SrO in an amount greater than or equal to 1 mol %, and $B_2O_3$ in an amount from greater than 0 mol % to less than or equal to 5 mol %.

In embodiments, the glass composition includes: greater than or equal to 30 mol % $SiO_2$; greater than or equal to 10 mol % to less than or equal to 25 mol % $Li_2O$; greater than or equal to 0 mol % to less than or equal to 17 mol % CaO; greater than or equal to 0 mol % to less than or equal to 3 mol % $K_2O$; and greater than or equal to 0 mol % to less than or equal to 14 mol % $B_2O_3$.

In embodiments, the glass composition includes: greater than or equal to 30 mol % $SiO_2$; greater than or equal to 10 mol % to less than or equal to 25 mol % $Li_2O$; greater than or equal to 0.5 mol % to less than or equal to 17 mol % CaO; greater than or equal to 0 mol % to less than or equal to 3 mol % $K_2O$; greater than or equal to 0 mol % to less than or equal to 11 mol % $B_2O_3$; and at least one of: less than or equal to 57.5 mol % $SiO_2$, greater than or equal to 1 mol % SrO, and greater than 0 mol % to less than or equal to 5 mol % $B_2O_3$, wherein the total content of $SiO_2$+$B_2O_3$+$Al_2O_3$+CaO+SrO+$Li_2O$+$Na_2O$+$K_2O$ is greater than or equal to 99.7 mol %.

Physical properties of the alkali aluminosilicate glass compositions as disclosed above will now be discussed. These physical properties can be achieved by modifying the component amounts of the alkali aluminosilicate glass composition, as will be discussed in more detail with reference to the examples.

Glass compositions according to embodiments have a high fracture toughness. Without wishing to be bound by any particular theory, the high fracture toughness may impart improved drop performance to the glass compositions. As utilized herein, the fracture toughness refers to the $K_{IC}$ value, and is measured by the chevron notched short bar method. The chevron notched short bar (CNSB) method utilized to measure the $K_{IC}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Additionally, the $K_{IC}$ values are measured on non-strengthened glass samples, such as measuring the $K_{IC}$ value prior to ion exchanging a glass article. The $K_{IC}$ values discussed herein are reported in MPa$\sqrt{}$m, unless otherwise noted.

In embodiments, the glass compositions exhibit a $K_{IC}$ value of greater than or equal to 0.75 MPa$\sqrt{}$m, such as greater than or equal to 0.76 MPa$\sqrt{}$m, greater than or equal to 0.77 MPa$\sqrt{}$m, greater than or equal to 0.78 MPa$\sqrt{}$m, greater than or equal to 0.79 MPa$\sqrt{}$m, greater than or equal to 0.80 MPa$\sqrt{}$m, greater than or equal to 0.81 MPa$\sqrt{}$m, greater than or equal to 0.82 MPa$\sqrt{}$m, greater than or equal to 0.83 MPa$\sqrt{}$m, greater than or equal to 0.84 MPa$\sqrt{}$m, greater than or equal to 0.85 MPa$\sqrt{}$m, greater than or equal to 0.86 MPa$\sqrt{}$m, greater than or equal to 0.87 MPa$\sqrt{}$m, greater than or equal to 0.88 MPa$\sqrt{}$m, greater than or equal to 0.89 MPa$\sqrt{}$m, greater than or equal to 0.90 MPa$\sqrt{}$m, greater than or equal to 0.91 MPa$\sqrt{}$m, greater than or equal to 0.92 MPa$\sqrt{}$m, greater than or equal to 0.93 MPa$\sqrt{}$m, greater than or equal to 0.94 MPa$\sqrt{}$m, greater than or equal to 0.95 MPa$\sqrt{}$m, greater than or equal to 0.96 MPa$\sqrt{}$m, greater than or equal to 0.97 MPa$\sqrt{}$m, greater than or equal to 0.98 MPa$\sqrt{}$m, greater than or equal to 0.99 MPa$\sqrt{}$m, greater than or equal to 1.0 MPa$\sqrt{}$m, or more. The high fracture toughness of the glass compositions described herein increases the resistance of the glasses to damage.

In embodiments, the liquidus viscosity of the glass compositions is less than or equal to 1000 P, such as less than or equal to 950 P, less than or equal to 900 P, less than or equal to 850 P, less than or equal to 800 P, less than or equal to 750 P, less than or equal to 700 P, less than or equal to 650 P, less than or equal to 600 P, less than or equal to 550 P, less than or equal to 500 P, less than or equal to 450 P, less than or equal to 400 P, less than or equal to 350 P, less than or equal to 300 P, less than or equal to 250 P, less than or equal to 200 P, less than or equal to 150 P, or less than or equal to 100 P. In embodiments, the liquidus viscosity is greater than or equal to 50 P, such as greater than or equal to 100 P, greater than or equal to 150 P, greater than or equal to 200 P, greater than or equal to 250 P, greater than or equal to 300 P, greater than or equal to 350 P, greater than or equal to 400 P, greater than or equal to 450 P, greater than or equal to 500 P, greater than or equal to 550 P, greater than or equal to 600 P, greater than or equal to 650 P, greater than or equal to 700 P, greater than or equal to 750 P, greater than or equal to 800 P, greater than or equal to 850 P, greater than or equal to 900 P, or greater than or equal to 950 P. It should be understood that, in embodiments, any of the above ranges may be combined with any other range, such that the liquidus viscosity is from greater than or equal to 50 P to less than or equal to 1000 P, such as greater than or equal to 100 P to less than or equal to 950 P, greater than or equal to 150 P to less than or equal to 900 P, greater than or equal to 200 P to less than or equal to 850 P, greater than or equal to 250 P to less than or equal to 800 P, greater than or equal to 300 P to less than or equal to 750 P, greater than or equal to 350 P to less than or equal to 700 P, greater than or equal to 400 P to less than or equal to 650 P, greater than or equal to 450 P to less than or equal to 600 P, greater than or equal to 500 P to less than or equal to 550 P, and all ranges and sub-ranges between the foregoing values. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96 (2012), titled "Standard Practice for Measuring Viscosity of Glass Above the Softening Point".

In embodiments, the Young's modulus (E) of the glass compositions may be from greater than or equal to 80 GPa to less than or equal to 100 GPa, such as from greater than or equal to 81 GPa to less than or equal to 99 GPa, from greater than or equal to 82 GPa to less than or equal to 98 GPa, from greater than or equal to 83 GPa to less than or equal to 97 GPa, from greater than or equal to 84 GPa to less than or equal to 96 GPa, from greater than or equal to 85 GPa to less than or equal to 95 GPa, from greater than or equal to 86 GPa to less than or equal to 94 GPa, from greater than or equal to 87 GPa to less than or equal to 93 GPa, from greater than or equal to 88 GPa to less than or equal to 92 GPa, from greater than or equal to 89 GPa to less than or equal to 91 GPa, from greater than or equal to 90 GPa to less than or equal to 100 GPa, and all ranges and sub-ranges between the foregoing values. In embodiments, the Young's modulus (E) of the glass compositions may be greater than or equal to 80 GPa, such as greater than or equal to 81 GPa, greater than or equal to 82 GPa, greater than or equal to 83 GPa, greater than or equal to 84 GPa, greater than or equal to 85 GPa, greater than or equal to 86 GPa, greater than or equal to 87 GPa, greater than or equal to 88 GPa, greater than or equal to 89 GPa, greater than or equal to 90 GPa, greater than or equal to 91 GPa, greater than or equal to 92 GPa, greater than or equal to 93 GPa, greater than or equal to 94 GPa, greater than or equal to 95 GPa, or more. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Nonmetallic Parts."

In embodiments, the glass composition may have a shear modulus (G) of from greater than or equal to 33 GPa to less than or equal to 39 GPa, such as from greater than or equal to 34 GPa to less than or equal to 38 GPa, from greater than or equal to 35 GPa to less than or equal to 37 GPa, from greater than or equal to 34 GPa to less than or equal to 36 GPa, and all ranges and sub-ranges between the foregoing values. The shear modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In embodiments, the glass compositions may have a Poisson's ratio (v) of from greater than or equal to 0.2 to less than or equal to 0.26, such as from greater than or equal to 0.21 to less than or equal to 0.25, from greater than or equal to 0.22 to less than or equal to 0.24, greater than or equal to 0.23, and all ranges and sub-ranges between the foregoing values. The Poisson's ratio value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

From the above compositions, glass articles according to embodiments may be formed by any suitable method. In embodiments, the glass compositions may be formed by rolling processes, such as thin-rolling processes.

The glass composition and the articles produced therefrom may be characterized by the manner in which it may be formed. For instance, the glass composition may be characterized as float-formable (i.e., formed by a float process) or roll-formable (i.e., formed by a rolling process).

In one or more embodiments, the glass compositions described herein may form glass articles that exhibit an amorphous microstructure and may be substantially free of crystals or crystallites. In other words, the glass articles formed from the glass compositions described herein may exclude glass-ceramic materials.

As mentioned above, in embodiments, the glass compositions described herein can be strengthened, such as by ion exchange, making a glass article that is damage resistant for applications such as, but not limited to, display covers. With reference to FIG. 1, a glass article is depicted that has a first region under compressive stress (e.g., first and second compressive layers 120, 122 in FIG. 1) extending from the surface to a depth of compression (DOC) of the glass article and a second region (e.g., central region 130 in FIG. 1) under a tensile stress or central tension (CT) extending from the DOC into the central or interior region of the glass article. As used herein, DOC refers to the depth at which the stress within the glass article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at or near the surface of the glass article, and the CS varies with distance d from the surface according to a function. Referring again to FIG. 1, a first segment 120 extends from first surface 110 to a depth $d_1$ and a second segment 122 extends from second surface 112 to a depth dz. Together, these segments define a compression or CS of glass article 100. Compressive stress (including surface CS) may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

In embodiments, the CS of the glass articles is from greater than or equal to 500 MPa to less than or equal to 1200 MPa, such as from greater than or equal to 525 MPa to less than or equal to 1150 MPa, from greater than or equal to 550 MPa to less than or equal to 1100 MPa, from greater than or equal to 575 MPa to less than or equal to 1050 MPa, from greater than or equal to 600 MPa to less than or equal to 1000 MPa, from greater than or equal to 625 MPa to less than or equal to 975 MPa, from greater than or equal to 650 MPa to less than or equal to 950 MPa, from greater than or equal to 675 MPa to less than or equal to 925 MPa, from greater than or equal to 700 MPa to less than or equal to 900 MPa, from greater than or equal to 725 MPa to less than or equal to 875 MPa, from greater than or equal to 750 MPa to less than or equal to 850 MPa, from greater than or equal to 775 MPa to less than or equal to 825 MPa, from greater than or equal to 700 MPa to less than or equal to 800 MPa, and all ranges and sub-ranges between the foregoing values.

In one or more embodiments, $Na^+$ and/or $K^+$ ions are exchanged into the glass article and the $Na^{++}$ ions diffuse to a deeper depth into the glass article than the $K^+$ ions. The depth of penetration of $K^+$ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement. The potassium DOL may define a depth of a compressive stress spike ($DOL_{SP}$), where a stress profile transitions from a steep spike region to a less-steep deep region. The deep region extends from the bottom of the spike to the depth of compression. The $DOL_{SP}$ of the glass articles may be from greater than or equal to 5 μm to less than or equal to 30 μm, such as from greater than or equal to 6 μm to less than or equal to 25 μm, from greater than or equal to 7 μm to less than or equal to 20 μm, from greater than or equal to 8 μm to less than or equal to 15 μm, or from greater than or equal to 9 μm to less than or equal to 11 μm, greater than or equal to 10 μm, and all ranges and sub-ranges between the foregoing values.

The compressive stress of both major surfaces (110, 112 in FIG. 1) is balanced by stored tension in the central region 130 of the glass article. The maximum central tension (CT) and DOC values may be measured using a scattered light polariscope (SCALP) technique known in the art. The refracted near-field (RNF) method or SCALP may be used to determine the stress profile of the glass articles. When the RNF method is utilized to measure the stress profile, the maximum CT value provided by SCALP is utilized in the RNF method. In particular, the stress profile determined by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The glass articles have a high maximum central tension (CT). The high CT values achieved in the glass articles indicates a high degree of stored energy, as produced by the ion exchange process. The high CT values and associated high level of stored energy provide improved resistance to fracture to the glass articles, particularly with respect to repeated drops and contact with rough surfaces. The high CT values described herein may be achieved by ion exchanging the glass substrates in a molten salt bath containing sodium ions for a time period of less than or equal to 16 hours. In embodiments, the glass articles have a maximum central tension (CT) greater than or equal to 150 MPa, such as greater than or equal to 160 MPa, greater than or equal to 170 MPa, greater than or equal to 180 MPa, greater than or equal to 190 MPa, greater than or equal to 200 MPa, greater than or equal to 210 MPa, greater than or equal to 220 MPa, greater than or equal to 230 MPa, greater than or equal to 240 MPa, greater than or equal to 250 MPa, greater than or equal to 260 MPa, greater than or equal to 270 MPa, greater than or equal to 280 MPa, greater than or equal to 290 MPa, greater than or equal to 300 MPa, and all ranges and sub-ranges between the foregoing values. In some embodiments, the glass article may have a CT of less than or equal to 400 MPa, such as less than or equal to 390 MPa, less than or equal to 380 MPa, less than or equal to 370 MPa, less than or equal to 360 MPa, less than or equal to 350 MPa, less than or equal to 340 MPa, less than or equal to 330 MPa, less than or equal to 320 MPa, less than or equal to 310 MPa, less than or equal to 300 MPa, less than or equal to 290 MPa, less than or equal to 280 MPa, less than or equal to 270 MPa, less than or equal to 260 MPa, less than or equal to 250 MPa, less than or equal to 240 MPa, less than or equal to 230 MPa, less than or equal to 220 MPa, less than or equal to 210 MPa, less than or equal to 200 MPa, less than or equal to 190 MPa, less than or equal to 180 MPa, less than or equal to 170 MPa, less than or equal to 160 MPa, and all ranges and sub-ranges between the foregoing values. It should be understood that, in embodiments, any of the above ranges may be combined with any other range, such that the glass article may have a maximum CT from greater than or equal to 150 MPa to less than or equal to 400 MPa, such as from greater than or equal to 160 MPa to less than or equal to 390 MPa, from greater than or equal to 170 MPa to less than or equal to 380 MPa, from greater than or equal to 180 MPa to less than or equal to 370 MPa, from greater than or equal to 190 MPa to less than or equal to 360 MPa, from greater than or equal to 200 MPa to less than or equal to 350 MPa, from greater than or equal to 210 MPa to less than or equal to 340 MPa, from greater than or equal to 220 MPa to less than or equal to 330 MPa, from greater than or equal to 230 MPa to less than or equal to 320 MPa, from greater than or equal to 240 MPa to less than or equal to 310 MPa, from greater than or equal to 250 MPa to less than or equal to 300 MPa, from greater than or equal to 260 MPa to less than or equal to 290 MPa, from greater than or equal to 270 MPa to less than or equal to 280 MPa, and all ranges and sub-ranges between the foregoing values.

The high fracture toughness values of the glass compositions described herein also may enable improved performance. The high fracture toughness of the glass compositions results in improved resistance to fracture when the glass articles are ion exchange, as compared to glass compositions with lower fracture toughness values.

As noted above, DOC is measured using a scattered light polariscope (SCALP) technique known in the art. The DOC is provided in some embodiments herein as a portion of the thickness (t) of the glass article. In embodiments, the glass articles may have a depth of compression (DOC) from greater than or equal to 0.15t to less than or equal to 0.25t, such as from greater than or equal to 0.16t to less than or equal to 0.24t, from greater than or equal to 0.17t to less than or equal to 0.23t, from greater than or equal to 0.18t to less than or equal to 0.22t, from greater than or equal to 0.19t to less than or equal to 0.21t, from greater than or equal to 0.15t to less than or equal to 0.20t, and all ranges and sub-ranges between the foregoing values. In embodiments, the glass articles may have a depth of compression (DOC) of greater than or equal to 0.15t, such as greater than or equal to 0.16t, greater than or equal to 0.17t, greater than or equal to 0.18t, greater than or equal to 0.19t, greater than or equal to 0.20t, greater than or equal to 0.21t, greater than or equal to 0.22t, greater than or equal to 0.23t, greater than or equal to 0.24t, or more. In embodiments, the glass articles may have a depth of compression (DOC) of greater than or equal to 100 μm, such as greater than or equal to 150 μm, or more.

Compressive stress layers may be formed in the glass by exposing the glass to an ion exchange solution. In embodiments, the ion exchange solution may be a molten nitrate salt. In embodiments, the ion exchange solution contains sodium ions. In some embodiments, the ion exchange solution may be molten $KNO_3$, molten $NaNO_3$, or combinations thereof. In certain embodiments, the ion exchange solution may include less than or equal to 95% molten $KNO_3$, such as less than or equal to 90% molten $KNO_3$, less than or equal to 80% molten $KNO_3$, less than or equal to 70% molten $KNO_3$, less than or equal to 60% molten $KNO_3$, less than or equal to 50% molten $KNO_3$, less than or equal to 40% molten $KNO_3$, less than or equal to 30% molten $KNO_3$, less than or equal to 20% molten $KNO_3$, less than or equal to 10% molten $KNO_3$, or less. In embodiments, the ion exchange solution may include greater than or equal to 5% molten $NaNO_3$, such as greater than or equal to 10% molten $NaNO_3$, greater than or equal to 20% molten $NaNO_3$, greater than or equal to 30% molten $NaNO_3$, greater than or equal to 40% molten $NaNO_3$, greater than or equal to 50% molten $NaNO_3$, greater than or equal to 60% molten $NaNO_3$, greater than or equal to 70% molten $NaNO_3$, greater than or equal to 80% molten $NaNO_3$, greater than or equal to 90% molten $NaNO_3$, or 100% molten $NaNO_3$. In embodiments, the ion exchange solution may include less than or equal to 90% molten $KNO_3$ and greater than or equal to 10% molten $NaNO_3$, such as less than or equal to 80% molten $KNO_3$ and greater than or equal to 20% molten $NaNO_3$, less than or equal to 70% molten $KNO_3$ and greater than or equal to 30% molten $NaNO_3$, less than or equal to 60% molten $KNO_3$ and greater than or equal to 40% molten $NaNO_3$, less than or equal to 50% molten $KNO_3$ and greater than or equal to 50% molten $NaNO_3$, less than or equal to 40% molten $KNO_3$ and greater than or equal to 60% molten $NaNO_3$, less than or equal to 30% molten $KNO_3$ and greater than or equal to 70% molten NaNO₃, less than or equal to 20% molten KNO₃ and greater than or equal to 80% molten NaNO₃, less than or equal to 10% molten KNO₃ and greater than or equal to 90% molten NaNO₃, less than or equal to 1% molten KNO₃ and greater than or equal to 99% molten NaNO₃, and all ranges and sub-ranges between the foregoing values. In embodiments, other sodium and potassium salts may be used in the ion exchange solution, such as, for example sodium or potassium nitrites, phosphates, or sulfates. In embodiments, the ion exchange solution may include lithium salts, such as LiNO₃. In embodiments, the ion exchange solution contains 100% NaNO₃. The ion exchange solution is described herein on the basis of weight percent (wt %). In embodiments, additives may be present in the ion exchange solution, such as silicic acid.

The glass composition may be exposed to the ion exchange solution by dipping a glass substrate made from the glass composition into a bath of the ion exchange solution, spraying the ion exchange solution onto a glass substrate made from the glass composition, or otherwise physically applying the ion exchange solution to a glass substrate made from the glass composition to form the ion exchanged glass article. Upon exposure to the glass composition, the ion exchange solution may, according to embodiments, be at a temperature from greater than or equal to 360° C. to less than or equal to 500° C., such as from greater than or equal to 370° C. to less than or equal to 490° C., from greater than or equal to 380° C. to less than or equal to 480° C., from greater than or equal to 390° C. to less than or equal to 470° C., from greater than or equal to 400° C. to less than or equal to 460° C., from greater than or equal to 410° C. to less than or equal to 450° C., from greater than or equal to 420° C. to less than or equal to 440° C., greater than or equal to 430° C., and all ranges and sub-ranges between the foregoing values.

In embodiments, the glass composition may be exposed to the ion exchange solution for a duration of less than or equal to 16 hours, such as less than or equal to 15 hours, less than or equal to 14 hours, less than or equal to 13 hours, less than or equal to 12 hours, less than or equal to 11 hours, less than or equal to 10 hours, less than or equal to 9 hours, less than or equal to 8 hours, less than or equal to 7 hours, less than or equal to 6 hours, less than or equal to 5 hours, less than or equal to 4 hours, less than or equal to 3 hours, less than or equal to 2 hours, or less. In embodiments, the glass composition may be exposed to the ion exchange solution for a duration from greater than or equal to 1 hour to less than or equal to 16 hours, such as from greater than or equal to 2 hours to less than or equal to 15 hours, from greater than or equal to 3 hours to less than or equal to 14 hours, from greater than or equal to 4 hours to less than or equal to 13 hours, from greater than or equal to 5 hours to less than or equal to 12 hours, from greater than or equal to 6 hours to less than or equal to 11 hours, from greater than or equal to 7 hours to less than or equal to 10 hours, from greater than or equal to 8 hours to less than or equal to 9 hours, and all ranges and sub-ranges between the foregoing values. The glass compositions disclosed herein allow the glass articles to achieve high CT values (greater than or equal to 150 MPa) when ion exchanged in a sodium containing bath for less than or equal to 16 hours.

The ion exchange process may be performed in an ion exchange solution under processing conditions that provide an improved compressive stress profile as disclosed, for example, in U.S. Patent Application Publication No. 2016/0102011, which is incorporated herein by reference in its entirety. In some embodiments, the ion exchange process may be selected to form a parabolic stress profile in the glass articles, such as those stress profiles described in U.S. Patent Application Publication No. 2016/0102014, which is incorporated herein by reference in its entirety.

After an ion exchange process is performed, it should be understood that a composition at the surface of an ion exchanged glass article is be different than the composition of the as-formed glass substrate (i.e., the glass substrate before it undergoes an ion exchange process). This results from one type of alkali metal ion in the as-formed glass substrate, such as, for example Li⁺ or Na⁺, being replaced with larger alkali metal ions, such as, for example Na⁺ or K⁺, respectively. However, the glass composition at or near the center of the glass article will, in embodiments, still have the composition of the as-formed non-ion exchanged glass substrate utilized to form the glass article. As utilized herein, the center refers to any point in the glass article that is located a distance of at least 0.5t from every surface of the glass article, where t is the thickness of the glass article.

Figure 2A:
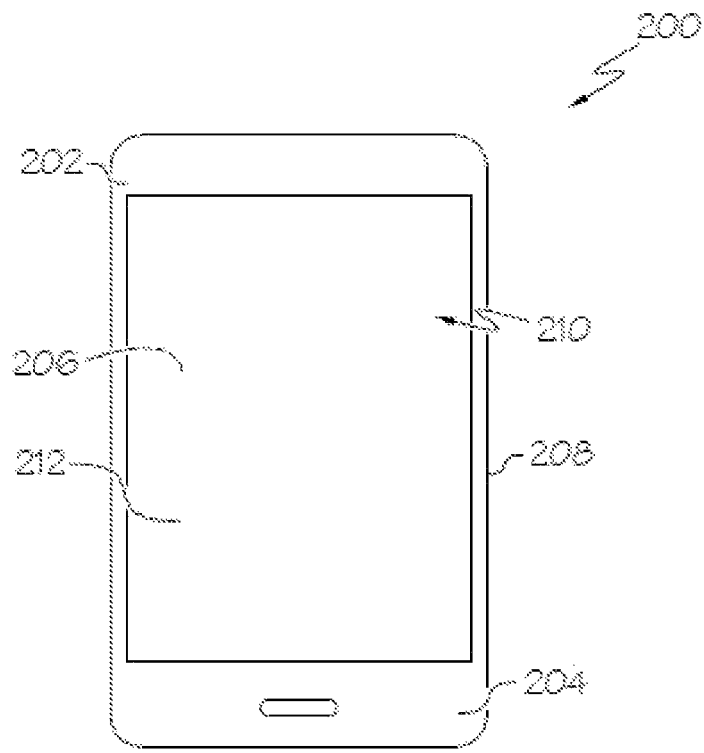
FIG. 2A is a plan view of an exemplary electronic device incorporating any of the glass articles disclosed herein.
Figure 2B:
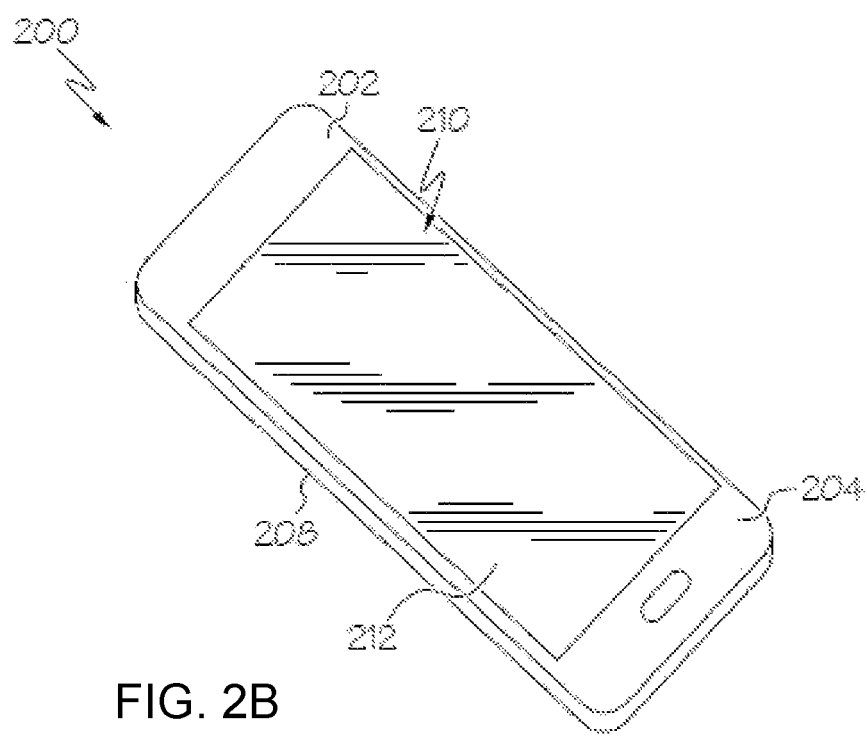
FIG. 2B is a perspective view of the exemplary electronic device of FIG. 2A.

The glass articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover 212 at or over the front surface of the housing such that it is over the display. In embodiments, at least a portion of at least one of the cover 212 or the housing 202 may include any of the glass articles described herein.

Examples

Embodiments will be further clarified by the following examples. It should be understood that these examples are not limiting to the embodiments described above.

Glass compositions were prepared and analyzed. The analyzed glass compositions had the components listed in Table I below, and were prepared by conventional glass forming methods. In Table I, all components are in mol %, the strain point, the annealing point, the softening point, the stress optical coefficient, the refractive index, the Poisson's ratio (v), the Young's modulus (E), the shear modulus (G), and the liquidus viscosity of the glass compositions were measured according to the methods disclosed in this specification.

TABLE I

| Example | A | B | C | D | E | F |
|---|---|---|---|---|---|---|
| $SiO_2$ | 64.08 | 64.08 | 64.08 | 64.13 | 64.17 | 64.15 |
| $Al_2O_3$ | 18.45 | 18.44 | 18.46 | 18.42 | 18.41 | 18.41 |
| $P_2O_5$ | 0 | 0 | 0 | 0 | 0 | 0 |
| $B_2O_3$ | 0 | 0 | 0 | 0 | 0 | 0 |
| MgO | 0 | 0 | 0 | 0 | 0 | 0 |
| CaO | 0.51 | 0.99 | 1.48 | 1.96 | 2.44 | 2.93 |
| SrO | 0 | 0 | 0 | 0 | 0 | 0 |
| $Li_2O$ | 12.92 | 12.92 | 12.9 | 12.88 | 12.84 | 12.86 |

TABLE I-continued

|  |  |  |  |  |  |  |
|---|---|---|---|---|---|---|
| Na₂O | 3.82 | 3.35 | 2.85 | 2.36 | 1.89 | 1.4 |
| K₂O | 0 | 0 | 0 | 0 | 0 | 0 |
| TiO₂ | 0 | 0 | 0 | 0 | 0 | 0 |
| SnO₂ | 0 | 0 | 0 | 0 | 0 | 0 |
| Fe₂O₃ | 0 | 0 | 0 | 0 | 0 | 0 |
| ZrO₂ | 0 | 0 | 0 | 0 | 0 | 0 |
| Total | 99.78 | 99.78 | 99.77 | 99.75 | 99.75 | 99.75 |
| SiO₂ + B₂O₃ + Al₂O₃ + CaO + SrO + Li₂O + Na₂O + K₂O | 99.78 | 99.78 | 99.77 | 99.75 | 99.75 | 99.75 |
| Strain Point (° C.) | 640.5 | 641.9 | 642.6 | 645.1 | 646.9 | 649 |
| Anneal Point (° C.) | 687.3 | 688.6 | 690 | 691.8 | 693.1 | 695.2 |
| Softening Point (° C.) |  |  |  |  |  |  |
| Young's Modulus (GPa) | 84.5 | 85.2 | 85.2 | 85.4 | 86.0 | 86.2 |
| Shear Modulus (GPa) | 34.7 | 34.9 | 35.0 | 35.1 | 35.2 | 35.3 |
| Poisson's ratio | 0.219 | 0.221 | 0.218 | 0.216 | 0.222 | 0.222 |
| Refractive Index | 1.519 | 1.520 | 1.522 | 1.523 | 1.524 | 1.525 |
| Stress Optical Coefficient | 2.842 | 2.828 | 2.782 | 2.809 | 2.803 | 2.825 |
| Liquidus Viscosity (P) | 4336 | 3056 | 2892 | 2206 | 2167 | 1960 |

| Example | G | H | I | J | K | L |
|---|---|---|---|---|---|---|
| SiO₂ | 43.01 | 44.04 | 43.86 | 44.57 | 44.4 | 43.32 |
| Al₂O₃ | 23.34 | 22.89 | 23.25 | 22.78 | 22.8 | 23.16 |
| P₂O₅ | 0 | 0 | 0 | 0 | 0 | 0 |
| B₂O₃ | 4.04 | 1.81 | 5.63 | 1.81 | 1.8 | 1.78 |
| MgO | 0.32 | 0.35 | 0.28 | 0.34 | 0.33 | 0.36 |
| CaO | 14.56 | 16.17 | 12.34 | 15.44 | 14.98 | 16.59 |
| SrO | 0.01 | 0.01 | 0.01 | 0.01 | 0.01 | 0.01 |
| Li₂O | 12.88 | 12.87 | 12.78 | 13.2 | 13.82 | 13.39 |
| Na₂O | 1.32 | 1.33 | 1.33 | 1.34 | 1.33 | 0.84 |
| K₂O | 0.45 | 0.45 | 0.46 | 0.44 | 0.46 | 0.46 |
| TiO₂ | 0 | 0 | 0 | 0 | 0 | 0 |
| SnO₂ | 0.06 | 0.05 | 0.06 | 0.05 | 0.06 | 0.06 |
| Fe₂O₃ | 0.02 | 0.02 | 0.01 | 0.02 | 0.02 | 0.02 |
| ZrO₂ | 0 | 0 | 0 | 0 | 0 | 0 |
| Total | 100.01 | 99.99 | 100.01 | 100 | 100.01 | 99.99 |
| SiO₂ + B₂O₃ + Al₂O₃ + CaO + SrO + Li₂O + Na₂O + K₂O | 95.57 | 97.76 | 94.03 | 97.78 | 97.8 | 97.77 |
| Strain Point (° C.) | 551.5 | 567.8 | 544.4 | 560.6 | 563.1 | 571.9 |
| Anneal Point (° C.) | 590.1 | 605.9 | 584.1 | 598.5 | 601.2 | 609.8 |
| Softening Point (° C.) | 756.9 | 769.8 | 753.7 | 763.8 | 766.3 | 773.3 |
| Young's Modulus (GPa) | 93.0 | 95.6 | 90.3 | 95.4 | 94.6 | 95.0 |
| Shear Modulus (GPa) | 37.2 | 38.1 | 36.0 | 38.1 | 37.9 | 38.1 |
| Poisson's ratio | 0.252 | 0.256 | 0.253 | 0.253 | 0.248 | 0.249 |
| Refractive Index | 1.563 | 1.568 | 1.556 | 1.567 | 1.566 | 1.568 |
| Stress Optical Coefficient | 2.427 | 2.354 | 2.547 | 2.351 | 2.414 | 2.342 |
| Liquidus Viscosity (P) |  | 252 | 123 | 215 |  | 91 |

| Example | M | N | O | P | Q | R |
|---|---|---|---|---|---|---|
| SiO₂ | 52.5 | 52.06 | 52.07 | 52.05 | 52.21 | 52.35 |
| Al₂O₃ | 22.75 | 23.06 | 23.13 | 23.17 | 23.15 | 23.07 |
| P₂O₅ | 0 | 0 | 0 | 0 | 0 | 0 |
| B₂O₃ | 2 | 2.02 | 2.01 | 2.02 | 1.97 | 1.92 |
| MgO | 0.11 | 0.09 | 0.06 | 0.07 | 0.07 | 0.07 |
| CaO | 3.51 | 2.56 | 1.55 | 1.55 | 1.55 | 1.52 |
| SrO | 4.3 | 5.33 | 6.31 | 5.37 | 4.39 | 3.42 |
| Li₂O | 12.97 | 13.02 | 13 | 13.9 | 14.8 | 15.79 |
| Na₂O | 1.33 | 1.34 | 1.35 | 1.34 | 1.35 | 1.35 |
| K₂O | 0.46 | 0.47 | 0.46 | 0.46 | 0.46 | 0.45 |
| TiO₂ | 0 | 0 | 0 | 0 | 0 | 0 |
| SnO₂ | 0.05 | 0.05 | 0.05 | 0.05 | 0.05 | 0.05 |
| Fe₂O₃ | 0.01 | 0.01 | 0.01 | 0.01 | 0.01 | 0.01 |
| ZrO₂ | 0 | 0 | 0 | 0 | 0 | 0 |
| Total | 99.99 | 100.01 | 100 | 99.99 | 100.01 | 100 |
| SiO₂ + B₂O₃ + Al₂O₃ + CaO + SrO + Li₂O + Na₂O + K₂O | 97.82 | 97.84 | 97.87 | 97.84 | 97.91 | 97.95 |
| Strain Point (° C.) | 602.4 | 603.5 | 603.7 | 598.1 | 600.7 | 594.9 |
| Anneal Point (° C.) | 645 | 646.3 | 646.4 | 640.2 | 642.5 | 637.4 |
| Softening Point (° C.) | 826 | 833.3 | 838 | 828.6 | 823.4 | 827.7 |
| Young's Modulus (GPa) | 88.9 | 89.2 | 88.9 | 87.9 | 88.4 | 88.3 |
| Shear Modulus (GPa) | 35.9 | 35.9 | 35.8 | 35.6 | 35.6 | 35.6 |
| Poisson's ratio | 0.237 | 0.244 | 0.244 | 0.234 | 0.242 | 0.237 |
| Refractive Index | 1.546 | 1.546 | 1.546 | 1.544 | 1.543 | 1.542 |
| Stress Optical Coefficient | 2.589 | 2.578 | 2.608 | 2.597 | 2.617 | 2.621 |
| Liquidus Viscosity (P) | <359 | <324 |  | 240 |  | <353 |

| Example | S | T | U | V | X | Y |
|---|---|---|---|---|---|---|
| SiO₂ | 51.92 | 52.41 | 52.39 | 52.03 | 52.27 | 52.29 |
| Al₂O₃ | 22.64 | 22.35 | 22.46 | 22.68 | 22.6 | 22.53 |
| P₂O₅ | 0 | 0 | 0 | 0 | 0 | 0 |
| B₂O₃ | 4.04 | 4.02 | 3.98 | 4.06 | 4.04 | 4.03 |
| MgO | 0.15 | 0.14 | 0.12 | 1.08 | 2.11 | 1.06 |
| CaO | 6.25 | 5.14 | 4.13 | 5.22 | 4.16 | 4.15 |
| SrO | 0.01 | 0 | 0 | 0 | 0.01 | 0 |
| Li₂O | 13.12 | 14.06 | 15.05 | 13.06 | 12.95 | 14.07 |
| Na₂O | 1.35 | 1.35 | 1.35 | 1.35 | 1.36 | 1.35 |
| K₂O | 0.46 | 0.46 | 0.46 | 0.46 | 0.46 | 0.46 |
| TiO₂ | 0 | 0 | 0 | 0 | 0 | 0 |
| SnO₂ | 0.06 | 0.06 | 0.06 | 0.06 | 0.06 | 0.06 |
| Fe₂O₃ | 0.01 | 0.01 | 0.01 | 0.01 | 0.01 | 0.01 |
| ZrO₂ | 0 | 0 | 0 | 0 | 0 | 0 |
| Total | 100.01 | 100 | 100.01 | 100.02 | 100.02 | 100.01 |
| SiO₂ + B₂O₃ + Al₂O₃ + CaO + SrO + Li₂O + Na₂O + K₂O | 95.75 | 95.77 | 95.84 | 94.81 | 93.8 | 94.85 |
| Strain Point (° C.) | 590.7 | 582.9 | 579.2 | 584.3 | 581.4 | 586.8 |

TABLE I-continued

| | | | | | | |
|---|---|---|---|---|---|---|
| Anneal Point (° C.) | 633.4 | 625.4 | 621 | 627 | 624 | 630.8 |
| Softening Point (° C.) | 810.2 | 810.5 | 806.5 | 813.9 | 813.4 | 812.1 |
| Young's Modulus (GPa) | 87.2 | 86.6 | 86.3 | 87.8 | 87.6 | 86.9 |
| Shear Modulus (GPa) | 35.1 | 35.0 | 34.8 | 35.4 | 35.4 | 35.1 |
| Poisson's ratio | 0.242 | 0.239 | 0.240 | 0.242 | 0.239 | 0.237 |
| Refractive Index | 1.539 | 1.538 | 1.536 | 1.539 | 1.538 | 1.537 |
| Stress Optical Coefficient | 2.690 | 2.724 | 2.725 | 2.685 | 2.714 | 2.716 |
| Liquidus Viscosity (P) | <350 | <341 | <305 | <202 | <251 | <223 |

| Example | Z | AA | BB | CC | DD | EE |
|---|---|---|---|---|---|---|
| $SiO_2$ | 63.61 | 64.2 | 63.77 | 60.33 | 57.71 | 57.12 |
| $Al_2O_3$ | 18.93 | 18.52 | 18.83 | 22.37 | 18.82 | 22.16 |
| $P_2O_5$ | 0 | 0 | 0 | 0 | 0 | 0 |
| $B_2O_3$ | 0 | 0 | 0 | 0 | 0 | 0 |
| MgO | 0.03 | 0.03 | 0.03 | 0.03 | 0.15 | 0.15 |
| CaO | 0.02 | 0.02 | 0.02 | 0.02 | 6.11 | 6.15 |
| SrO | 0 | 0 | 0 | 0 | 0 | 0 |
| $Li_2O$ | 13.13 | 13.32 | 13.7 | 13.58 | 13.52 | 12.96 |
| $Na_2O$ | 4.21 | 3.85 | 3.6 | 3.6 | 3.6 | 1.38 |
| $K_2O$ | 0.01 | 0.01 | 0.01 | 0.01 | 0.01 | 0.01 |
| $TiO_2$ | 0 | 0 | 0 | 0 | 0 | 0 |
| $SnO_2$ | 0.05 | 0.05 | 0.05 | 0.05 | 0.05 | 0.05 |
| $Fe_2O_3$ | 0.01 | 0.01 | 0.01 | 0.01 | 0.01 | 0.01 |
| $ZrO_2$ | 0 | 0 | 0 | 0 | 0 | 0 |
| Total | 100 | 100.01 | 100.02 | 100 | 99.98 | 99.99 |
| $SiO_2 + B_2O_3 + Al_2O_3 + CaO + SrO + Li_2O + Na_2O + K_2O$ | 99.91 | 99.92 | 99.93 | 99.91 | 99.77 | 99.78 |
| Strain Point (° C.) | 645.5 | 648.3 | 653.2 | 658.4 | 561.8 | 652.1 |
| Anneal Point (° C.) | 692.9 | 696.4 | 700.2 | 703.9 | 603.5 | 694.6 |
| Softening Point (° C.) | 917.3 | 919.2 | 917.7 | 913.1 | | 884.1 |
| Young's Modulus (GPa) | 84.2 | 84.4 | 84.3 | 87.2 | 89.5 | 90.4 |
| Shear Modulus (GPa) | 34.7 | 34.8 | 34.6 | 35.6 | 36.1 | 36.8 |
| Poisson's ratio | 0.215 | 0.215 | 0.219 | 0.226 | 0.238 | 0.230 |
| Refractive Index | 1.519 | 1.519 | 1.519 | 1.526 | 1.538 | 1.540 |
| Stress Optical Coefficient | 2.845 | 2.828 | 2.850 | 2.777 | 2.612 | 2.644 |
| Liquidus Viscosity (P) | | | | | | |

| Example | FF | GG | HH | II | JJ | KK |
|---|---|---|---|---|---|---|
| $SiO_2$ | 54.79 | 54.72 | 54.44 | 54.57 | 54.67 | 54.83 |
| $Al_2O_3$ | 22.63 | 22.67 | 22.65 | 22.74 | 22.71 | 21.71 |
| $P_2O_5$ | 0 | 0 | 0 | 0 | 0 | 0 |
| $B_2O_3$ | 0 | 0 | 0 | 0 | 0 | 0 |
| MgO | 0.03 | 0.07 | 0.11 | 0.04 | 0.03 | 0.04 |
| CaO | 0.02 | 1.98 | 4.01 | 0.03 | 0.04 | 0.02 |
| SrO | 0 | 0 | 0.01 | 1.96 | 3.88 | 0 |
| $Li_2O$ | 14.58 | 14.62 | 14.82 | 14.74 | 14.75 | 14.53 |
| $Na_2O$ | 7.88 | 5.86 | 3.88 | 5.85 | 3.86 | 7.83 |
| $K_2O$ | 0.01 | 0.01 | 0.01 | 0.01 | 0.01 | 0.01 |
| $TiO_2$ | 0.01 | 0.01 | 0.01 | 0.01 | 0.01 | 0.97 |
| $SnO_2$ | 0.05 | 0.05 | 0.05 | 0.05 | 0.05 | 0.05 |
| $Fe_2O_3$ | 0.01 | 0.01 | 0.01 | 0.01 | 0.01 | 0.01 |
| $ZrO_2$ | 0 | 0 | 0 | 0 | 0 | 0 |
| Total | 100.01 | 100 | 100 | 100.01 | 100.02 | 100 |
| $SiO_2 + B_2O_3 + Al_2O_3 + CaO + SrO + Li_2O + Na_2O + K_2O$ | 99.91 | 99.86 | 99.82 | 99.9 | 99.92 | 98.93 |
| Strain Point (° C.) | 606.7 | 605 | 612.9 | 608.3 | 612.1 | |
| Anneal Point (° C.) | 649.5 | 647.7 | 654.1 | 650.6 | 654.7 | |
| Softening Point (° C.) | | | | | | |
| Young's Modulus (GPa) | 86.1 | 88.3 | 89.8 | 87.5 | 88.5 | |
| Shear Modulus (GPa) | 35.1 | 35.8 | 36.3 | 35.6 | 36.0 | |
| Poisson's ratio | 0.226 | 0.232 | 0.235 | 0.227 | 0.230 | |
| Refractive Index | 1.527 | 1.532 | 1.538 | 1.533 | 1.538 | |
| Stress Optical Coefficient | 2.708 | 2.647 | 2.605 | 2.639 | 2.601 | 2.342 |
| Liquidus Viscosity (P) | | | | | | |

Additional glass compositions were prepared including components in the amounts listed in Table II below. In Table II, all components are in mol %.

TABLE II

| Example No. | $SiO_2$ | $B_2O_3$ | $Al_2O_3$ | $Li_2O$ | $Na_2O$ | $K_2O$ | MgO | CaO | SrO | BaO | $SiO_2 + B_2O_3 + Al_2O_3 + SrO + Li_2O + Na_2O + K_2O$ |
|---|---|---|---|---|---|---|---|---|---|---|---|
| 0 | 51.74 | 0 | 21.44 | 11.94 | 5.62 | 0 | 0.3 | 8.89 | 0 | 0 | 99.63 |
| 1 | 51.38 | 0 | 21.76 | 12.15 | 5.63 | 0 | 0.25 | 7.24 | 1.52 | 0 | 99.68 |
| 2 | 51.61 | 0 | 21.53 | 13.22 | 5.62 | 0 | 0.26 | 7.43 | 0.25 | 0 | 99.66 |
| 3 | 51.08 | 0 | 22.02 | 12.38 | 5.62 | 0 | 0.22 | 6.03 | 2.56 | 0 | 99.69 |
| 4 | 51.23 | 0 | 21.87 | 13.44 | 5.61 | 0 | 0.22 | 5.81 | 1.75 | 0 | 99.71 |
| 5 | 51.53 | 0 | 21.58 | 14.2 | 5.61 | 0 | 0.23 | 6.32 | 0.46 | 0 | 99.7 |
| 6 | 50.81 | 0 | 22.26 | 12.56 | 5.59 | 0 | 0.19 | 4.99 | 3.49 | 0 | 99.7 |

TABLE II-continued

| Example No. | $SiO_2$ | $B_2O_3$ | $Al_2O_3$ | $Li_2O$ | $Na_2O$ | $K_2O$ | MgO | CaO | SrO | BaO | $SiO_2 + B_2O_3 + Al_2O_3 + SrO + Li_2O + Na_2O + K_2O$ |
|---|---|---|---|---|---|---|---|---|---|---|---|
| 7 | 50.9 | 0 | 22.15 | 13.63 | 5.59 | 0 | 0.19 | 4.75 | 2.7 | 0 | 99.72 |
| 8 | 51.12 | 0 | 21.94 | 14.39 | 5.59 | 0 | 0.19 | 4.81 | 1.89 | 0 | 99.74 |
| 9 | 51.46 | 0 | 21.61 | 15.18 | 5.59 | 0 | 0.2 | 5.24 | 0.65 | 0 | 99.73 |
| 10 | 50.75 | 0 | 22.29 | 12.45 | 5.55 | 0 | 0.16 | 3.91 | 4.79 | 0 | 99.74 |
| 11 | 51.03 | 0 | 22 | 12.2 | 5.52 | 0 | 0.12 | 3.1 | 5.91 | 0 | 99.76 |
| 12 | 50.73 | 0 | 22.29 | 13.4 | 5.5 | 0 | 0.14 | 3.28 | 4.56 | 0 | 99.76 |
| 13 | 51.47 | 0 | 21.55 | 12.08 | 5.51 | 0 | 0.09 | 2.09 | 7.08 | 0 | 99.78 |
| 14 | 51.07 | 0 | 21.94 | 13.17 | 5.48 | 0 | 0.1 | 2.43 | 5.69 | 0 | 99.78 |
| 15 | 50.82 | 0 | 22.17 | 14.06 | 5.46 | 0 | 0.11 | 2.62 | 4.65 | 0 | 99.78 |
| 16 | 52.06 | 0 | 20.96 | 12.1 | 5.5 | 0 | 0.06 | 0.59 | 8.57 | 0 | 99.78 |
| 17 | 51.72 | 0 | 21.28 | 13.17 | 5.49 | 0 | 0.06 | 0.91 | 7.23 | 0 | 99.8 |
| 18 | 51.42 | 0 | 21.57 | 13.97 | 5.46 | 0 | 0.07 | 1.21 | 6.18 | 0 | 99.81 |
| 19 | 51.13 | 0 | 21.84 | 14.82 | 5.44 | 0 | 0.08 | 1.46 | 5.11 | 0 | 99.8 |
| 20 | 50.69 | 0 | 22.35 | 13.11 | 5.56 | 0 | 0.17 | 4.18 | 3.84 | 0 | 99.73 |
| 21 | 50.77 | 0 | 22.26 | 13.95 | 5.56 | 0 | 0.17 | 4.19 | 3 | 0 | 99.73 |
| 22 | 50.97 | 0 | 22.06 | 14.75 | 5.57 | 0 | 0.17 | 4.19 | 2.2 | 0 | 99.74 |
| 23 | 51.22 | 0 | 21.81 | 15.59 | 5.57 | 0 | 0.17 | 4.2 | 1.36 | 0 | 99.75 |
| 24 | 50.65 | 0 | 22.36 | 13.81 | 5.52 | 0 | 0.15 | 3.51 | 3.9 | 0 | 99.75 |
| 25 | 50.7 | 0 | 22.3 | 14.74 | 5.52 | 0 | 0.15 | 3.47 | 3.03 | 0 | 99.76 |
| 26 | 50.89 | 0 | 22.1 | 15.67 | 5.54 | 0 | 0.14 | 3.38 | 2.2 | 0 | 99.78 |
| 27 | 50.69 | 0 | 22.29 | 14.47 | 5.47 | 0 | 0.12 | 2.88 | 3.96 | 0 | 99.76 |
| 28 | 50.7 | 0 | 22.27 | 15.51 | 5.49 | 0 | 0.12 | 2.79 | 3.03 | 0 | 99.79 |
| 29 | 50.81 | 0 | 22.15 | 15.23 | 5.44 | 0 | 0.1 | 2.15 | 4.02 | 0 | 99.8 |
| 30 | 51.35 | 0 | 21.67 | 16.54 | 5.56 | 0 | 0.16 | 3.89 | 0.75 | 0 | 99.76 |
| 31 | 50.94 | 0 | 22.03 | 16.3 | 5.53 | 0 | 0.13 | 3.08 | 1.9 | 0 | 99.78 |
| 32 | 51.26 | 0 | 21.7 | 17.62 | 5.54 | 0 | 0.14 | 2.95 | 0.7 | 0 | 99.77 |
| 33 | 50.74 | 0 | 22.2 | 16.16 | 5.48 | 0 | 0.11 | 2.49 | 2.72 | 0 | 99.79 |
| 34 | 50.9 | 0 | 22.02 | 17.29 | 5.51 | 0 | 0.11 | 2.27 | 1.81 | 0 | 99.8 |
| 35 | 51.2 | 0 | 21.72 | 18.74 | 5.52 | 0 | 0.11 | 2.03 | 0.58 | 0 | 99.79 |
| 36 | 50.89 | 0 | 22.04 | 16.2 | 5.43 | 0 | 0.09 | 1.55 | 3.71 | 0 | 99.82 |
| 37 | 50.87 | 0 | 22.03 | 17.41 | 5.45 | 0 | 0.08 | 1.37 | 2.68 | 0 | 99.81 |
| 38 | 50.97 | 0 | 21.91 | 18.67 | 5.48 | 0 | 0.08 | 1.09 | 1.7 | 0 | 99.82 |
| 39 | 51.21 | 0 | 21.66 | 20.22 | 5.5 | 0 | 0.09 | 0.79 | 0.43 | 0 | 99.81 |
| 40 | 50.2 | 6.72 | 22.47 | 10.55 | 1.4 | 0.3 | 8.28 | 0.04 | 0 | 0 | 91.68 |
| 41 | 49.87 | 6.77 | 22.73 | 10.5 | 1.48 | 0.34 | 6.91 | 1.36 | 0 | 0 | 93.05 |
| 42 | 50.04 | 6.7 | 22.67 | 11.61 | 1.43 | 0.32 | 7.12 | 0.05 | 0 | 0 | 92.82 |
| 43 | 49.63 | 6.84 | 22.93 | 10.41 | 1.53 | 0.35 | 5.87 | 2.38 | 0 | 0 | 94.07 |
| 44 | 49.76 | 6.7 | 22.99 | 11.51 | 1.51 | 0.36 | 5.69 | 1.42 | 0 | 0 | 94.25 |
| 45 | 49.95 | 6.66 | 22.86 | 12.41 | 1.46 | 0.34 | 6.19 | 0.07 | 0 | 0 | 93.75 |
| 46 | 49.3 | 7.14 | 23.02 | 10.36 | 1.55 | 0.36 | 4.81 | 3.41 | 0 | 0 | 95.14 |
| 47 | 49.5 | 6.84 | 23.17 | 11.44 | 1.54 | 0.37 | 4.61 | 2.45 | 0 | 0 | 95.31 |
| 48 | 49.68 | 6.66 | 23.2 | 12.31 | 1.52 | 0.37 | 4.73 | 1.46 | 0 | 0 | 95.2 |
| 49 | 49.86 | 6.62 | 23.08 | 13.24 | 1.48 | 0.35 | 5.22 | 0.09 | 0 | 0 | 94.72 |
| 50 | 48.63 | 8.05 | 22.82 | 10.41 | 1.52 | 0.33 | 3.4 | 4.81 | 0 | 0 | 96.57 |
| 51 | 48.21 | 8.69 | 22.64 | 10.51 | 1.45 | 0.31 | 2.37 | 5.82 | 0 | 0 | 97.63 |
| 52 | 48.56 | 8.19 | 22.88 | 11.58 | 1.47 | 0.33 | 4.55 | 2.9 | 0 | 0 | 97.56 |
| 53 | 48.13 | 8.82 | 22.68 | 10.56 | 1.36 | 0.3 | 1.39 | 6.76 | 0 | 0 | 98.61 |
| 54 | 48.26 | 8.69 | 22.73 | 11.7 | 1.38 | 0.31 | 1.4 | 5.54 | 0 | 0 | 98.61 |
| 55 | 48.52 | 8.34 | 22.9 | 12.55 | 1.39 | 0.33 | 1.42 | 4.56 | 0 | 0 | 98.59 |
| 56 | 48.45 | 8.38 | 22.97 | 10.48 | 1.25 | 0.3 | 0.11 | 8 | 0 | 0 | 99.83 |
| 57 | 48.41 | 8.49 | 22.93 | 11.71 | 1.26 | 0.31 | 0.07 | 6.81 | 0 | 0 | 99.92 |
| 58 | 48.49 | 8.44 | 22.95 | 12.64 | 1.25 | 0.32 | 0.05 | 5.85 | 0 | 0 | 99.94 |
| 59 | 48.7 | 8.23 | 23.05 | 13.57 | 1.25 | 0.33 | 0.04 | 4.84 | 0 | 0 | 99.97 |
| 60 | 49.03 | 7.46 | 23.03 | 10.91 | 1.54 | 0.35 | 3.81 | 3.82 | 0 | 0 | 96.14 |
| 61 | 49.34 | 7.01 | 23.22 | 11.72 | 1.54 | 0.37 | 3.91 | 2.82 | 0 | 0 | 96.02 |
| 62 | 49.57 | 6.72 | 23.31 | 12.58 | 1.53 | 0.38 | 4.02 | 1.82 | 0 | 0 | 95.91 |
| 63 | 49.69 | 6.63 | 23.32 | 13.49 | 1.51 | 0.37 | 4.13 | 0.8 | 0 | 0 | 95.81 |
| 64 | 48.85 | 7.73 | 23.05 | 11.8 | 1.5 | 0.35 | 2.82 | 3.88 | 0 | 0 | 97.16 |
| 65 | 49.21 | 7.19 | 23.29 | 12.62 | 1.51 | 0.37 | 2.99 | 2.86 | 0 | 0 | 97.05 |
| 66 | 49.46 | 6.84 | 23.44 | 13.49 | 1.51 | 0.38 | 2.99 | 1.84 | 0 | 0 | 96.96 |
| 67 | 48.75 | 7.96 | 23.05 | 12.77 | 1.43 | 0.35 | 1.79 | 3.89 | 0 | 0 | 98.2 |
| 68 | 49.11 | 7.41 | 23.32 | 13.61 | 1.44 | 0.36 | 1.85 | 2.86 | 0 | 0 | 98.11 |
| 69 | 48.83 | 7.99 | 23.13 | 13.8 | 1.32 | 0.34 | 0.75 | 3.84 | 0 | 0 | 99.25 |
| 70 | 49.71 | 6.65 | 23.34 | 14.41 | 1.48 | 0.36 | 3.85 | 0.11 | 0 | 0 | 96.06 |
| 71 | 49.47 | 6.84 | 23.49 | 14.11 | 1.49 | 0.38 | 2.66 | 1.5 | 0 | 0 | 97.28 |
| 72 | 49.57 | 6.79 | 23.49 | 15.38 | 1.47 | 0.36 | 2.76 | 0.12 | 0 | 0 | 97.18 |
| 73 | 49.19 | 7.32 | 23.4 | 14.25 | 1.41 | 0.37 | 1.52 | 2.5 | 0 | 0 | 98.44 |
| 74 | 49.36 | 7.05 | 23.55 | 15.14 | 1.42 | 0.37 | 1.56 | 1.49 | 0 | 0 | 98.38 |
| 75 | 49.42 | 7.01 | 23.57 | 16.42 | 1.42 | 0.35 | 1.63 | 0.11 | 0 | 0 | 98.3 |
| 76 | 49.08 | 7.73 | 23.3 | 14.8 | 1.25 | 0.35 | 0.04 | 3.45 | 0 | 0 | 99.96 |
| 77 | 49.29 | 7.39 | 23.5 | 15.71 | 1.27 | 0.36 | 0.04 | 2.42 | 0 | 0 | 99.94 |
| 78 | 49.35 | 7.24 | 23.62 | 16.63 | 1.3 | 0.35 | 0.04 | 1.43 | 0 | 0 | 99.92 |

TABLE II-continued

| Example No. | SiO$_2$ | B$_2$O$_3$ | Al$_2$O$_3$ | Li$_2$O | Na$_2$O | K$_2$O | MgO | CaO | SrO | BaO | SiO$_2$ + B$_2$O$_3$ + Al$_2$O$_3$ + SrO + Li$_2$O + Na$_2$O + K$_2$O |
|---|---|---|---|---|---|---|---|---|---|---|---|
| 79 | 49.33 | 7.26 | 23.65 | 17.94 | 1.33 | 0.33 | 0.04 | 0.07 | 0 | 0 | 99.91 |
| 80 | 54.79 | 3.81 | 21.1 | 9.75 | 1.36 | 0.36 | 8.77 | 0.08 | 0 | 0 | 91.25 |
| 81 | 54.24 | 3.74 | 21.58 | 10.24 | 1.37 | 0.36 | 7.13 | 1.35 | 0 | 0 | 92.88 |
| 82 | 54.46 | 3.59 | 21.5 | 11.13 | 1.42 | 0.36 | 7.33 | 0.21 | 0 | 0 | 92.67 |
| 83 | 53.69 | 3.79 | 22.07 | 10.65 | 1.36 | 0.36 | 5.81 | 2.27 | 0 | 0 | 94.19 |
| 84 | 53.77 | 3.53 | 22.16 | 11.69 | 1.43 | 0.36 | 5.51 | 1.54 | 0 | 0 | 94.48 |
| 85 | 54.14 | 3.42 | 21.9 | 12.26 | 1.48 | 0.36 | 6.11 | 0.34 | 0 | 0 | 93.9 |
| 86 | 53.16 | 3.94 | 22.49 | 10.92 | 1.33 | 0.37 | 4.66 | 3.11 | 0 | 0 | 95.32 |
| 87 | 53.22 | 3.62 | 22.64 | 12.03 | 1.41 | 0.37 | 4.29 | 2.42 | 0 | 0 | 95.71 |
| 88 | 53.4 | 3.38 | 22.62 | 12.81 | 1.48 | 0.36 | 4.27 | 1.67 | 0 | 0 | 95.72 |
| 89 | 53.78 | 3.25 | 22.34 | 13.46 | 1.53 | 0.36 | 4.8 | 0.47 | 0 | 0 | 95.19 |
| 90 | 52.7 | 4.22 | 22.81 | 10.83 | 1.31 | 0.39 | 3.5 | 4.22 | 0 | 0 | 96.48 |
| 91 | 52.47 | 4.56 | 22.82 | 10.54 | 1.32 | 0.42 | 2.67 | 5.18 | 0 | 0 | 97.31 |
| 92 | 52.6 | 4.01 | 23.06 | 11.78 | 1.36 | 0.41 | 2.71 | 4.06 | 0 | 0 | 97.28 |
| 93 | 52.24 | 5.08 | 22.67 | 10.3 | 1.34 | 0.46 | 1.66 | 6.25 | 0 | 0 | 98.34 |
| 94 | 52.41 | 4.44 | 22.98 | 11.44 | 1.37 | 0.44 | 1.85 | 5.07 | 0 | 0 | 98.15 |
| 95 | 52.53 | 3.97 | 23.19 | 12.39 | 1.4 | 0.43 | 1.92 | 4.17 | 0 | 0 | 98.08 |
| 96 | 51.98 | 5.88 | 22.34 | 10.1 | 1.35 | 0.49 | 0.12 | 7.74 | 0 | 0 | 99.88 |
| 97 | 52.1 | 5.3 | 22.64 | 11.21 | 1.38 | 0.48 | 0.31 | 6.58 | 0 | 0 | 99.69 |
| 98 | 52.23 | 4.79 | 22.88 | 12.08 | 1.4 | 0.47 | 0.5 | 5.65 | 0 | 0 | 99.5 |
| 99 | 52.39 | 4.26 | 23.11 | 13 | 1.43 | 0.46 | 0.65 | 4.7 | 0 | 0 | 99.35 |
| 100 | 52.86 | 3.93 | 22.82 | 11.5 | 1.34 | 0.38 | 3.73 | 3.43 | 0 | 0 | 96.26 |
| 101 | 52.98 | 3.63 | 22.88 | 12.39 | 1.4 | 0.37 | 3.63 | 2.7 | 0 | 0 | 96.35 |
| 102 | 53.12 | 3.37 | 22.9 | 13.25 | 1.48 | 0.37 | 3.53 | 1.97 | 0 | 0 | 96.46 |
| 103 | 53.29 | 3.18 | 22.84 | 14.11 | 1.55 | 0.37 | 3.49 | 1.16 | 0 | 0 | 96.5 |
| 104 | 52.7 | 3.81 | 23.09 | 12.22 | 1.37 | 0.4 | 2.91 | 3.5 | 0 | 0 | 97.09 |
| 105 | 52.78 | 3.5 | 23.17 | 13.22 | 1.43 | 0.39 | 2.76 | 2.73 | 0 | 0 | 97.22 |
| 106 | 52.88 | 3.25 | 23.19 | 14.23 | 1.51 | 0.38 | 2.57 | 1.97 | 0 | 0 | 97.41 |
| 107 | 52.61 | 3.71 | 23.26 | 12.86 | 1.41 | 0.42 | 2.16 | 3.56 | 0 | 0 | 97.83 |
| 108 | 52.68 | 3.4 | 23.34 | 13.96 | 1.46 | 0.41 | 2.01 | 2.73 | 0 | 0 | 97.98 |
| 109 | 52.56 | 3.71 | 23.31 | 13.53 | 1.44 | 0.44 | 1.35 | 3.65 | 0 | 0 | 98.64 |
| 110 | 53.31 | 3.08 | 22.86 | 15.08 | 1.59 | 0.38 | 3.15 | 0.54 | 0 | 0 | 96.84 |
| 111 | 52.85 | 3.16 | 23.24 | 14.89 | 1.53 | 0.39 | 2.23 | 1.68 | 0 | 0 | 97.74 |
| 112 | 53.04 | 3.02 | 23.08 | 16.27 | 1.6 | 0.39 | 2.11 | 0.47 | 0 | 0 | 97.87 |
| 113 | 52.68 | 3.3 | 23.37 | 14.6 | 1.48 | 0.42 | 1.69 | 2.45 | 0 | 0 | 98.3 |
| 114 | 52.73 | 3.12 | 23.32 | 15.82 | 1.54 | 0.41 | 1.45 | 1.59 | 0 | 0 | 98.53 |
| 115 | 52.87 | 3.04 | 23.12 | 17.42 | 1.59 | 0.42 | 1.23 | 0.31 | 0 | 0 | 98.77 |
| 116 | 52.55 | 3.67 | 23.31 | 14.43 | 1.46 | 0.45 | 0.7 | 3.41 | 0 | 0 | 99.28 |
| 117 | 52.62 | 3.38 | 23.34 | 15.69 | 1.5 | 0.45 | 0.57 | 2.45 | 0 | 0 | 99.43 |
| 118 | 52.65 | 3.23 | 23.25 | 17.07 | 1.53 | 0.45 | 0.34 | 1.47 | 0 | 0 | 99.65 |
| 119 | 52.75 | 3.19 | 23.01 | 18.92 | 1.56 | 0.45 | 0.04 | 0.07 | 0 | 0 | 99.95 |
| 120 | 47.58 | 10.41 | 25.97 | 14.58 | 1.11 | 0.24 | 0.04 | 0.02 | 0 | 0 | 99.91 |
| 121 | 48.22 | 8.91 | 25.28 | 13.3 | 1.08 | 0.22 | 3.02 | 0 | 0 | 0 | 97.01 |
| 122 | 47.31 | 8.76 | 25.64 | 13.87 | 1.13 | 0.23 | 0.32 | 2.69 | 0 | 0 | 99.63 |
| 123 | 48.84 | 7.94 | 24.63 | 12.32 | 1.07 | 0.22 | 5.07 | 0 | 0 | 0 | 95.02 |
| 124 | 48.03 | 7.44 | 24.86 | 12.51 | 1.1 | 0.21 | 3.23 | 2.56 | 0 | 0 | 96.71 |
| 125 | 47.09 | 7.66 | 25.35 | 13.32 | 1.15 | 0.22 | 0.49 | 4.67 | 0 | 0 | 99.46 |
| 126 | 49.44 | 7.02 | 23.93 | 11.52 | 1.1 | 0.23 | 6.88 | 0 | 0 | 0 | 93.24 |
| 127 | 48.64 | 6.53 | 24.19 | 11.61 | 1.11 | 0.22 | 5.17 | 2.48 | 0 | 0 | 94.78 |
| 128 | 47.81 | 6.43 | 24.52 | 12.01 | 1.14 | 0.21 | 3.31 | 4.52 | 0 | 0 | 96.64 |
| 129 | 46.82 | 6.64 | 25.02 | 12.83 | 1.19 | 0.22 | 0.6 | 6.64 | 0 | 0 | 99.36 |
| 130 | 49.99 | 5.8 | 22.95 | 11.02 | 1.19 | 0.28 | 8.89 | 0 | 0 | 0 | 91.23 |
| 131 | 50.19 | 4.82 | 22.23 | 11.07 | 1.31 | 0.34 | 10.11 | 0 | 0 | 0 | 89.96 |
| 132 | 49.47 | 4.68 | 22.74 | 10.86 | 1.25 | 0.29 | 8.22 | 2.45 | 0 | 0 | 91.74 |
| 133 | 50.31 | 3.72 | 21.57 | 11.34 | 1.43 | 0.42 | 11.21 | 0 | 0 | 0 | 88.79 |
| 134 | 49.65 | 3.64 | 22.03 | 11.02 | 1.37 | 0.36 | 9.38 | 2.49 | 0 | 0 | 90.56 |
| 135 | 49.04 | 3.57 | 22.42 | 10.89 | 1.34 | 0.32 | 7.97 | 4.41 | 0 | 0 | 91.99 |
| 136 | 50.47 | 1.95 | 20.87 | 11.83 | 1.59 | 0.5 | 12.68 | 0.05 | 0 | 0 | 87.26 |
| 137 | 49.84 | 2.02 | 21.22 | 11.49 | 1.54 | 0.45 | 10.82 | 2.56 | 0 | 0 | 89.12 |
| 138 | 49.29 | 2.01 | 21.55 | 11.28 | 1.5 | 0.42 | 9.44 | 4.46 | 0 | 0 | 90.51 |
| 139 | 48.64 | 1.98 | 21.92 | 11.15 | 1.48 | 0.38 | 8.03 | 6.38 | 0 | 0 | 91.93 |
| 140 | 49.47 | 6.02 | 23.46 | 11.09 | 1.14 | 0.24 | 7.4 | 1.13 | 0 | 0 | 92.55 |
| 141 | 48.74 | 5.89 | 23.84 | 11.25 | 1.14 | 0.22 | 5.75 | 3.12 | 0 | 0 | 94.2 |
| 142 | 47.9 | 5.8 | 24.19 | 11.6 | 1.17 | 0.22 | 3.96 | 5.15 | 0 | 0 | 96.03 |
| 143 | 47.01 | 5.71 | 24.5 | 12.08 | 1.21 | 0.22 | 2.02 | 7.21 | 0 | 0 | 97.94 |
| 144 | 49.16 | 4.97 | 23.11 | 10.88 | 1.21 | 0.26 | 7.28 | 3.09 | 0 | 0 | 92.68 |
| 145 | 48.38 | 4.88 | 23.49 | 11.02 | 1.21 | 0.24 | 5.66 | 5.08 | 0 | 0 | 94.3 |
| 146 | 47.48 | 4.81 | 23.84 | 11.36 | 1.24 | 0.23 | 3.89 | 7.11 | 0 | 0 | 96.07 |
| 147 | 48.72 | 3.9 | 22.78 | 10.85 | 1.3 | 0.29 | 7.06 | 5.06 | 0 | 0 | 92.9 |
| 148 | 47.89 | 3.84 | 23.16 | 10.99 | 1.3 | 0.27 | 5.47 | 7.05 | 0 | 0 | 94.5 |
| 149 | 48.21 | 2.76 | 22.47 | 10.99 | 1.4 | 0.32 | 6.77 | 7.03 | 0 | 0 | 93.18 |
| 150 | 46.3 | 5.33 | 24.58 | 12.35 | 1.27 | 0.23 | 0.64 | 9.26 | 0 | 0 | 99.32 |

TABLE II-continued

| Example No. | $SiO_2$ | $B_2O_3$ | $Al_2O_3$ | $Li_2O$ | $Na_2O$ | $K_2O$ | MgO | CaO | SrO | BaO | $SiO_2 + B_2O_3 + Al_2O_3 + SrO + Li_2O + Na_2O + K_2O$ |
|---|---|---|---|---|---|---|---|---|---|---|---|
| 151 | 47.01 | 4.46 | 23.84 | 11.47 | 1.28 | 0.24 | 3.22 | 8.45 | 0 | 0 | 96.75 |
| 152 | 45.81 | 4.35 | 24.24 | 12.17 | 1.35 | 0.25 | 0.57 | 11.22 | 0 | 0 | 99.39 |
| 153 | 47.41 | 3.47 | 23.17 | 11.11 | 1.34 | 0.28 | 4.82 | 8.37 | 0 | 0 | 95.15 |
| 154 | 46.46 | 3.43 | 23.51 | 11.48 | 1.38 | 0.27 | 3.03 | 10.41 | 0 | 0 | 96.94 |
| 155 | 45.27 | 3.31 | 23.92 | 12.14 | 1.44 | 0.28 | 0.42 | 13.19 | 0 | 0 | 99.55 |
| 156 | 47.6 | 1.94 | 22.42 | 11.16 | 1.47 | 0.34 | 6.04 | 8.99 | 0 | 0 | 93.92 |
| 157 | 46.7 | 1.92 | 22.78 | 11.36 | 1.48 | 0.33 | 4.41 | 10.99 | 0 | 0 | 95.56 |
| 158 | 45.77 | 1.88 | 23.12 | 11.69 | 1.51 | 0.32 | 2.65 | 13.03 | 0 | 0 | 97.32 |
| 159 | 44.66 | 1.73 | 23.53 | 12.27 | 1.57 | 0.32 | 0.09 | 15.8 | 0 | 0 | 99.88 |
| 160 | 53.23 | 13.5 | 23.23 | 9.96 | 0.9 | 0.29 | 0.99 | 0 | 0 | 0 | 101.11 |
| 161 | 51.29 | 10.25 | 23.87 | 10.32 | 1.01 | 0.29 | 3.57 | 0 | 0 | 0 | 97.03 |
| 162 | 51.81 | 10.92 | 23.62 | 10.21 | 0.95 | 0.3 | 1.09 | 1.06 | 0 | 0 | 98.87 |
| 163 | 49.67 | 7.78 | 24.41 | 10.56 | 1.11 | 0.27 | 5.28 | 0.89 | 0 | 0 | 94.69 |
| 164 | 49.61 | 7.64 | 24.38 | 10.55 | 1.08 | 0.28 | 3.56 | 2.87 | 0 | 0 | 96.41 |
| 165 | 50.66 | 9.06 | 23.93 | 10.38 | 1 | 0.3 | 1.13 | 3.51 | 0 | 0 | 98.84 |
| 166 | 48.2 | 5.65 | 24.74 | 10.81 | 1.22 | 0.26 | 6.83 | 2.26 | 0 | 0 | 93.14 |
| 167 | 47.9 | 5.32 | 24.9 | 10.79 | 1.19 | 0.26 | 5.18 | 4.44 | 0 | 0 | 94.8 |
| 168 | 48.29 | 5.88 | 24.71 | 10.72 | 1.14 | 0.27 | 3.51 | 5.44 | 0 | 0 | 96.45 |
| 169 | 49.45 | 7.31 | 24.22 | 10.55 | 1.05 | 0.3 | 1.13 | 5.95 | 0 | 0 | 98.83 |
| 170 | 47.32 | 4.06 | 24.22 | 11.22 | 1.35 | 0.29 | 8.82 | 2.69 | 0 | 0 | 91.15 |
| 171 | 47.51 | 3.53 | 23.24 | 11.55 | 1.41 | 0.34 | 10.28 | 2.1 | 0 | 0 | 89.68 |
| 172 | 46.5 | 2.98 | 24.15 | 11.4 | 1.38 | 0.3 | 8.21 | 5.03 | 0 | 0 | 91.74 |
| 173 | 48.18 | 3.08 | 22.09 | 11.83 | 1.45 | 0.39 | 11.71 | 1.23 | 0 | 0 | 88.25 |
| 174 | 46.94 | 2.54 | 23.06 | 11.72 | 1.43 | 0.36 | 9.67 | 4.25 | 0 | 0 | 90.3 |
| 175 | 46.18 | 2.25 | 23.7 | 11.61 | 1.41 | 0.34 | 6.14 | 6.32 | 0 | 0 | 91.81 |
| 176 | 49.43 | 2.15 | 20.69 | 12.02 | 1.48 | 0.45 | 13.68 | 0.05 | 0 | 0 | 86.27 |
| 177 | 48.13 | 1.8 | 21.52 | 12.01 | 1.48 | 0.43 | 11.59 | 3.02 | 0 | 0 | 88.39 |
| 178 | 47.2 | 1.52 | 22.18 | 11.94 | 1.46 | 0.41 | 10.08 | 5.17 | 0 | 0 | 89.88 |
| 179 | 46.39 | 1.32 | 22.8 | 11.85 | 1.44 | 0.39 | 8.6 | 7.18 | 0 | 0 | 91.37 |
| 180 | 47.14 | 4.17 | 24.77 | 11.04 | 1.29 | 0.26 | 7.27 | 4.03 | 0 | 0 | 92.7 |
| 181 | 47.05 | 4.23 | 25 | 10.94 | 1.25 | 0.26 | 5.67 | 5.57 | 0 | 0 | 94.3 |
| 182 | 47.32 | 4.68 | 24.92 | 10.86 | 1.2 | 0.27 | 4.04 | 6.68 | 0 | 0 | 95.93 |
| 183 | 47.85 | 5.34 | 24.64 | 10.78 | 1.14 | 0.29 | 2.33 | 7.6 | 0 | 0 | 97.64 |
| 184 | 46.35 | 3.12 | 24.61 | 11.25 | 1.34 | 0.28 | 7.2 | 5.82 | 0 | 0 | 92.77 |
| 185 | 46.14 | 3.18 | 24.89 | 11.15 | 1.3 | 0.28 | 5.62 | 7.41 | 0 | 0 | 94.35 |
| 186 | 46.33 | 3.58 | 24.87 | 11.06 | 1.25 | 0.28 | 4.01 | 8.59 | 0 | 0 | 95.96 |
| 187 | 45.88 | 2.39 | 24.21 | 11.47 | 1.38 | 0.31 | 7.16 | 7.17 | 0 | 0 | 92.81 |
| 188 | 45.59 | 2.48 | 24.52 | 11.37 | 1.33 | 0.31 | 5.61 | 8.76 | 0 | 0 | 94.36 |
| 189 | 45.71 | 1.76 | 23.68 | 11.66 | 1.4 | 0.35 | 7.13 | 8.28 | 0 | 0 | 92.84 |
| 190 | 47.93 | 5.34 | 24.43 | 10.78 | 1.12 | 0.3 | 1.12 | 8.94 | 0 | 0 | 98.84 |
| 191 | 46.2 | 3.46 | 24.74 | 11.1 | 1.24 | 0.3 | 3.45 | 9.46 | 0 | 0 | 96.5 |
| 192 | 47.02 | 4.19 | 24.38 | 10.96 | 1.17 | 0.31 | 1.11 | 10.82 | 0 | 0 | 98.85 |
| 193 | 45.45 | 2.36 | 24.41 | 11.41 | 1.33 | 0.32 | 5.09 | 9.61 | 0 | 0 | 94.89 |
| 194 | 45.64 | 2.72 | 24.41 | 11.3 | 1.27 | 0.32 | 3.46 | 10.85 | 0 | 0 | 96.51 |
| 195 | 46.41 | 3.22 | 24.16 | 11.12 | 1.2 | 0.33 | 1.11 | 12.41 | 0 | 0 | 98.85 |
| 196 | 45.6 | 1.31 | 23.43 | 11.72 | 1.39 | 0.37 | 6.61 | 9.54 | 0 | 0 | 93.36 |
| 197 | 45.33 | 1.48 | 23.69 | 11.62 | 1.35 | 0.36 | 5.06 | 11.06 | 0 | 0 | 94.89 |
| 198 | 45.42 | 1.71 | 23.78 | 11.5 | 1.3 | 0.36 | 3.43 | 12.46 | 0 | 0 | 96.53 |
| 199 | 46.09 | 1.94 | 23.68 | 11.29 | 1.23 | 0.36 | 1.07 | 14.3 | 0 | 0 | 98.89 |
| 200 | 45.22 | 2.03 | 20.4 | 23.72 | 6.46 | 0 | 0 | 2.07 | 0 | 0 | 99.9 |
| 201 | 47.03 | 2.32 | 20.29 | 21.88 | 6.3 | 0 | 0 | 2.07 | 0 | 0 | 99.89 |
| 202 | 46.32 | 2.13 | 19.64 | 23.48 | 6.24 | 0 | 0 | 2.08 | 0 | 0 | 99.89 |
| 203 | 48.33 | 2.55 | 20.14 | 20.6 | 6.2 | 0 | 0 | 2.06 | 0 | 0 | 99.88 |
| 204 | 48.25 | 2.43 | 19.53 | 21.57 | 6.04 | 0 | 0 | 2.07 | 0 | 0 | 99.89 |
| 205 | 47.33 | 2.22 | 19.04 | 23.19 | 6.04 | 0 | 0 | 2.07 | 0 | 0 | 99.89 |
| 206 | 49.38 | 2.77 | 20.04 | 19.52 | 6.16 | 0 | 0 | 2.04 | 0 | 0 | 99.91 |
| 207 | 49.34 | 2.62 | 19.48 | 20.43 | 5.97 | 0 | 0 | 2.06 | 0 | 0 | 99.9 |
| 208 | 49.13 | 2.49 | 18.99 | 21.36 | 5.85 | 0 | 0 | 2.06 | 0 | 0 | 99.88 |
| 209 | 48.35 | 2.32 | 18.44 | 22.9 | 5.83 | 0 | 0 | 2.06 | 0 | 0 | 99.9 |
| 210 | 50.71 | 3.04 | 19.99 | 18.05 | 6.11 | 0 | 0 | 1.99 | 0 | 0 | 99.89 |
| 211 | 51.95 | 3.3 | 19.84 | 16.82 | 6.08 | 0 | 0 | 1.91 | 0 | 0 | 99.9 |
| 212 | 51.08 | 2.96 | 19.57 | 18.37 | 5.9 | 0 | 0 | 2.01 | 0 | 0 | 99.89 |
| 213 | 53.38 | 3.62 | 19.49 | 15.51 | 6.08 | 0 | 0 | 1.79 | 0 | 0 | 99.87 |
| 214 | 52.3 | 3.22 | 19.39 | 17.15 | 5.89 | 0 | 0 | 1.93 | 0 | 0 | 99.88 |
| 215 | 51.65 | 2.94 | 19.23 | 18.3 | 5.75 | 0 | 0 | 2.01 | 0 | 0 | 99.88 |
| 216 | 55.41 | 3.99 | 18.92 | 13.77 | 6.14 | 0 | 0 | 1.64 | 0 | 0 | 99.87 |
| 217 | 54.25 | 3.66 | 18.8 | 15.43 | 5.96 | 0 | 0 | 1.76 | 0 | 0 | 99.86 |
| 218 | 53.42 | 3.35 | 18.77 | 16.65 | 5.81 | 0 | 0 | 1.86 | 0 | 0 | 99.86 |
| 219 | 52.7 | 3.05 | 18.67 | 17.84 | 5.66 | 0 | 0 | 1.95 | 0 | 0 | 99.87 |
| 220 | 50.07 | 2.84 | 19.77 | 19.14 | 6.04 | 0 | 0 | 2.04 | 0 | 0 | 99.9 |
| 221 | 49.82 | 2.68 | 19.36 | 20.08 | 5.9 | 0 | 0 | 2.06 | 0 | 0 | 99.9 |
| 222 | 49.68 | 2.56 | 18.86 | 20.97 | 5.77 | 0 | 0 | 2.06 | 0 | 0 | 99.9 |

TABLE II-continued

| Example No. | SiO$_2$ | B$_2$O$_3$ | Al$_2$O$_3$ | Li$_2$O | Na$_2$O | K$_2$O | MgO | CaO | SrO | BaO | SiO$_2$ + B$_2$O$_3$ + Al$_2$O$_3$ + SrO + Li$_2$O + Na$_2$O + K$_2$O |
|---|---|---|---|---|---|---|---|---|---|---|---|
| 223 | 49.46 | 2.46 | 18.28 | 21.96 | 5.68 | 0 | 0 | 2.05 | 0 | 0 | 99.89 |
| 224 | 50.61 | 2.82 | 19.46 | 19.09 | 5.87 | 0 | 0 | 2.05 | 0 | 0 | 99.9 |
| 225 | 50.36 | 2.67 | 19.01 | 20.05 | 5.73 | 0 | 0 | 2.07 | 0 | 0 | 99.89 |
| 226 | 50.23 | 2.58 | 18.44 | 20.96 | 5.62 | 0 | 0 | 2.06 | 0 | 0 | 99.89 |
| 227 | 51.14 | 2.8 | 19.15 | 19.04 | 5.71 | 0 | 0 | 2.05 | 0 | 0 | 99.89 |
| 228 | 50.85 | 2.66 | 18.67 | 20.05 | 5.59 | 0 | 0 | 2.07 | 0 | 0 | 99.89 |
| 229 | 51.71 | 2.8 | 18.75 | 19 | 5.59 | 0 | 0 | 2.03 | 0 | 0 | 99.88 |
| 230 | 49.44 | 2.42 | 17.68 | 22.7 | 5.62 | 0 | 0 | 2.03 | 0 | 0 | 99.89 |
| 231 | 50.34 | 2.56 | 18.08 | 21.31 | 5.55 | 0 | 0 | 2.05 | 0 | 0 | 99.89 |
| 232 | 49.98 | 2.49 | 17.13 | 22.75 | 5.52 | 0 | 0 | 2.02 | 0 | 0 | 99.89 |
| 233 | 50.94 | 2.63 | 18.34 | 20.39 | 5.53 | 0 | 0 | 2.06 | 0 | 0 | 99.89 |
| 234 | 50.75 | 2.58 | 17.62 | 21.42 | 5.48 | 0 | 0 | 2.04 | 0 | 0 | 99.89 |
| 235 | 50.4 | 2.54 | 16.58 | 22.9 | 5.47 | 0 | 0 | 2.01 | 0 | 0 | 99.9 |
| 236 | 51.97 | 2.77 | 18.26 | 19.35 | 5.51 | 0 | 0 | 2.02 | 0 | 0 | 99.88 |
| 237 | 51.61 | 2.66 | 17.67 | 20.46 | 5.45 | 0 | 0 | 2.03 | 0 | 0 | 99.88 |
| 238 | 51.33 | 2.63 | 16.91 | 21.57 | 5.43 | 0 | 0 | 2.02 | 0 | 0 | 99.89 |
| 239 | 50.95 | 2.6 | 15.82 | 23.1 | 5.45 | 0 | 0 | 1.98 | 0 | 0 | 99.9 |
| 240 | 45.17 | 2.32 | 23.32 | 23.61 | 5.42 | 0 | 0 | 0 | 0 | 0 | 99.84 |
| 241 | 46.63 | 2.63 | 22.77 | 21.86 | 5.98 | 0 | 0 | 0 | 0 | 0 | 99.87 |
| 242 | 46.83 | 2.55 | 22.4 | 22.47 | 5.61 | 0 | 0 | 0 | 0 | 0 | 99.86 |
| 243 | 47.86 | 2.83 | 22.19 | 20.5 | 6.51 | 0 | 0 | 0 | 0 | 0 | 99.89 |
| 244 | 48.48 | 2.88 | 21.87 | 20.36 | 6.3 | 0 | 0 | 0 | 0 | 0 | 99.89 |
| 245 | 48.25 | 2.74 | 21.8 | 21.31 | 5.79 | 0 | 0 | 0 | 0 | 0 | 99.89 |
| 246 | 49.01 | 2.92 | 21.64 | 19.57 | 6.74 | 0 | 0 | 0 | 0 | 0 | 99.88 |
| 247 | 49.54 | 2.98 | 21.26 | 19.45 | 6.66 | 0 | 0 | 0 | 0 | 0 | 99.89 |
| 248 | 49.82 | 3.01 | 21.24 | 19.41 | 6.42 | 0 | 0 | 0 | 0 | 0 | 99.9 |
| 249 | 49.66 | 2.88 | 21.21 | 20.25 | 5.9 | 0 | 0 | 0 | 0 | 0 | 99.9 |
| 250 | 50.59 | 2.97 | 21.74 | 18.45 | 6.11 | 0 | 0 | 0 | 0 | 0 | 99.86 |
| 251 | 51.77 | 3.13 | 22.15 | 17.29 | 5.52 | 0 | 0 | 0 | 0 | 0 | 99.86 |
| 252 | 51.54 | 2.96 | 21.3 | 18.43 | 5.64 | 0 | 0 | 0 | 0 | 0 | 99.87 |
| 253 | 52.74 | 3.44 | 22.23 | 15.99 | 5.47 | 0 | 0 | 0 | 0 | 0 | 99.87 |
| 254 | 52.57 | 3.13 | 21.6 | 17.4 | 5.16 | 0 | 0 | 0 | 0 | 0 | 99.86 |
| 255 | 52.31 | 3 | 20.95 | 18.29 | 5.31 | 0 | 0 | 0 | 0 | 0 | 99.86 |
| 256 | 53.9 | 3.85 | 21.95 | 14.25 | 5.93 | 0 | 0 | 0 | 0 | 0 | 99.88 |
| 257 | 53.65 | 3.59 | 21.34 | 15.79 | 5.51 | 0 | 0 | 0 | 0 | 0 | 99.88 |
| 258 | 53.44 | 3.36 | 20.87 | 16.9 | 5.3 | 0 | 0 | 0 | 0 | 0 | 99.87 |
| 259 | 53.06 | 3.21 | 20.19 | 17.95 | 5.46 | 0 | 0 | 0 | 0 | 0 | 99.87 |
| 260 | 50.12 | 2.95 | 21.24 | 19.08 | 6.49 | 0 | 0 | 0 | 0 | 0 | 99.88 |
| 261 | 50.19 | 2.99 | 20.91 | 19.2 | 6.6 | 0 | 0 | 0 | 0 | 0 | 99.89 |
| 262 | 50.45 | 3.04 | 20.81 | 19.12 | 6.49 | 0 | 0 | 0 | 0 | 0 | 99.91 |
| 263 | 50.74 | 3 | 20.7 | 19.31 | 6.15 | 0 | 0 | 0 | 0 | 0 | 99.9 |
| 264 | 51.11 | 2.95 | 20.93 | 18.85 | 6.03 | 0 | 0 | 0 | 0 | 0 | 99.87 |
| 265 | 51.05 | 2.99 | 20.38 | 19.12 | 6.35 | 0 | 0 | 0 | 0 | 0 | 99.89 |
| 266 | 51.23 | 3.01 | 20.05 | 19.26 | 6.34 | 0 | 0 | 0 | 0 | 0 | 99.89 |
| 267 | 51.86 | 2.97 | 20.56 | 18.79 | 5.7 | 0 | 0 | 0 | 0 | 0 | 99.88 |
| 268 | 51.57 | 3.01 | 19.7 | 19.37 | 6.25 | 0 | 0 | 0 | 0 | 0 | 99.9 |
| 269 | 52.28 | 3.08 | 19.83 | 18.87 | 5.82 | 0 | 0 | 0 | 0 | 0 | 99.88 |
| 270 | 51.15 | 2.9 | 20.24 | 19.8 | 5.8 | 0 | 0 | 0 | 0 | 0 | 99.89 |
| 271 | 51.51 | 2.97 | 19.67 | 19.55 | 6.2 | 0 | 0 | 0 | 0 | 0 | 99.9 |
| 272 | 51.87 | 2.78 | 19.3 | 20.38 | 5.56 | 0 | 0 | 0 | 0 | 0 | 99.89 |
| 273 | 51.63 | 3.03 | 19.13 | 19.72 | 6.39 | 0 | 0 | 0 | 0 | 0 | 99.9 |
| 274 | 51.84 | 2.89 | 18.62 | 20.4 | 6.14 | 0 | 0 | 0 | 0 | 0 | 99.89 |
| 275 | 52.35 | 2.61 | 18.23 | 21.39 | 5.3 | 0 | 0 | 0 | 0 | 0 | 99.88 |
| 276 | 52.24 | 3.2 | 18.73 | 19.32 | 6.4 | 0 | 0 | 0 | 0 | 0 | 99.89 |
| 277 | 51.88 | 3.13 | 17.64 | 20.41 | 6.84 | 0 | 0 | 0 | 0 | 0 | 99.9 |
| 278 | 52.16 | 2.85 | 17.08 | 21.5 | 6.3 | 0 | 0 | 0 | 0 | 0 | 99.89 |
| 279 | 52.84 | 2.45 | 16.73 | 22.67 | 5.18 | 0 | 0 | 0 | 0 | 0 | 99.87 |
| 280 | 52.85 | 1.88 | 23.35 | 12.38 | 1.25 | 0.43 | 0 | 5.9 | 1.94 | 0.02 | 99.98 |
| 281 | 52.13 | 1.8 | 23.33 | 12.53 | 1.31 | 0.47 | 0 | 5.27 | 2.69 | 0.46 | 99.53 |
| 282 | 52.84 | 1.82 | 23.18 | 12.49 | 1.29 | 0.44 | 0 | 5.12 | 1.59 | 1.23 | 98.77 |
| 283 | 51.82 | 1.73 | 23.38 | 12.51 | 1.35 | 0.5 | 0 | 4.83 | 3.23 | 0.64 | 99.35 |
| 284 | 52.28 | 1.73 | 23.14 | 12.58 | 1.35 | 0.48 | 0 | 4.55 | 2.31 | 1.58 | 98.42 |
| 285 | 52.94 | 1.77 | 23.03 | 12.55 | 1.31 | 0.45 | 0 | 4.54 | 1.32 | 2.09 | 97.91 |
| 286 | 51.8 | 1.69 | 23.37 | 12.39 | 1.39 | 0.52 | 0 | 4.34 | 3.8 | 0.68 | 99.3 |
| 287 | 52.22 | 1.69 | 23.14 | 12.48 | 1.39 | 0.51 | 0 | 4.11 | 2.83 | 1.63 | 98.37 |
| 288 | 52.61 | 1.69 | 22.97 | 12.56 | 1.38 | 0.49 | 0 | 3.99 | 2.01 | 2.31 | 97.7 |
| 289 | 53.21 | 1.71 | 22.89 | 12.56 | 1.33 | 0.45 | 0 | 3.94 | 1.04 | 2.87 | 97.13 |
| 290 | 52.14 | 1.7 | 22.92 | 12.21 | 1.48 | 0.52 | 0 | 3.55 | 4.85 | 0.62 | 99.37 |
| 291 | 52.42 | 1.72 | 22.43 | 12.09 | 1.55 | 0.5 | 0 | 2.75 | 6 | 0.53 | 99.46 |
| 292 | 52.87 | 1.72 | 22.38 | 12.18 | 1.54 | 0.5 | 0 | 2.95 | 4.36 | 1.49 | 98.5 |
| 293 | 52.57 | 1.71 | 22.13 | 11.97 | 1.59 | 0.48 | 0 | 1.73 | 7.43 | 0.39 | 99.61 |
| 294 | 53.12 | 1.73 | 21.91 | 12.05 | 1.61 | 0.48 | 0 | 2.06 | 5.64 | 1.39 | 98.6 |

TABLE II-continued

| Example No. | SiO$_2$ | B$_2$O$_3$ | Al$_2$O$_3$ | Li$_2$O | Na$_2$O | K$_2$O | MgO | CaO | SrO | BaO | SiO$_2$ + B$_2$O$_3$ + Al$_2$O$_3$ + SrO + Li$_2$O + Na$_2$O + K$_2$O |
|---|---|---|---|---|---|---|---|---|---|---|---|
| 295 | 53.59 | 1.74 | 21.83 | 12.1 | 1.6 | 0.48 | 0 | 2.23 | 4.34 | 2.08 | 97.91 |
| 296 | 52.71 | 1.66 | 22.08 | 11.75 | 1.58 | 0.46 | 0 | 0.16 | 9.5 | 0.09 | 99.9 |
| 297 | 53.2 | 1.7 | 21.78 | 11.84 | 1.62 | 0.46 | 0 | 0.51 | 7.75 | 1.14 | 98.86 |
| 298 | 53.71 | 1.72 | 21.54 | 11.9 | 1.64 | 0.46 | 0 | 0.77 | 6.37 | 1.89 | 98.11 |
| 299 | 54.32 | 1.74 | 21.37 | 11.93 | 1.64 | 0.45 | 0 | 0.97 | 4.99 | 2.59 | 97.41 |
| 300 | 52.19 | 1.69 | 23.07 | 12.31 | 1.44 | 0.52 | 0 | 3.79 | 3.86 | 1.12 | 98.87 |
| 301 | 52.47 | 1.68 | 23 | 12.41 | 1.42 | 0.51 | 0 | 3.76 | 2.92 | 1.83 | 98.17 |
| 302 | 52.83 | 1.67 | 22.88 | 12.49 | 1.4 | 0.49 | 0 | 3.64 | 2.08 | 2.51 | 97.48 |
| 303 | 53.32 | 1.66 | 22.79 | 12.52 | 1.37 | 0.47 | 0 | 3.45 | 1.29 | 3.13 | 96.87 |
| 304 | 52.85 | 1.7 | 22.58 | 12.24 | 1.5 | 0.51 | 0 | 3.2 | 3.66 | 1.75 | 98.24 |
| 305 | 53.21 | 1.68 | 22.6 | 12.31 | 1.47 | 0.5 | 0 | 3.15 | 2.67 | 2.41 | 97.59 |
| 306 | 53.62 | 1.66 | 22.62 | 12.36 | 1.43 | 0.48 | 0 | 3 | 1.81 | 3.03 | 96.98 |
| 307 | 53.65 | 1.72 | 22.02 | 12.15 | 1.56 | 0.48 | 0 | 2.53 | 3.54 | 2.33 | 97.65 |
| 308 | 54.12 | 1.7 | 22.14 | 12.18 | 1.52 | 0.48 | 0 | 2.47 | 2.49 | 2.92 | 97.1 |
| 309 | 54.47 | 1.74 | 21.55 | 12.03 | 1.61 | 0.46 | 0 | 1.71 | 3.57 | 2.86 | 97.14 |
| 310 | 53.96 | 1.64 | 22.77 | 12.44 | 1.34 | 0.45 | 0 | 3.05 | 0.67 | 3.68 | 96.32 |
| 311 | 54.1 | 1.64 | 22.56 | 12.31 | 1.42 | 0.47 | 0 | 2.69 | 1.45 | 3.36 | 96.63 |
| 312 | 54.85 | 1.61 | 22.75 | 12.24 | 1.33 | 0.45 | 0 | 2.28 | 0.41 | 4.09 | 95.92 |
| 313 | 54.61 | 1.69 | 22.07 | 12.12 | 1.51 | 0.47 | 0 | 2.15 | 2.14 | 3.25 | 96.76 |
| 314 | 55.16 | 1.65 | 22.36 | 12.08 | 1.43 | 0.45 | 0 | 1.89 | 1.27 | 3.73 | 96.29 |
| 315 | 55.94 | 1.59 | 22.78 | 11.96 | 1.31 | 0.43 | 0 | 1.4 | 0.21 | 4.39 | 95.62 |
| 316 | 55.2 | 1.73 | 21.4 | 11.91 | 1.61 | 0.44 | 0 | 1.05 | 3.28 | 3.38 | 96.62 |
| 317 | 55.86 | 1.7 | 21.69 | 11.85 | 1.53 | 0.44 | 0 | 0.91 | 2.19 | 3.84 | 96.17 |
| 318 | 56.53 | 1.64 | 22.16 | 11.74 | 1.42 | 0.43 | 0 | 0.6 | 1.25 | 4.24 | 95.77 |
| 319 | 57.36 | 1.57 | 22.83 | 11.56 | 1.27 | 0.41 | 0 | 0.04 | 0.12 | 4.86 | 95.16 |
| 320 | 54.59 | 1.4 | 22.57 | 11.31 | 1.56 | 0.34 | 8.04 | 0.34 | 0 | 0 | 92.11 |
| 321 | 53.79 | 1.44 | 23.08 | 11.71 | 1.54 | 0.38 | 6.62 | 1.44 | 0 | 0 | 93.38 |
| 322 | 53.98 | 1.47 | 22.93 | 11.56 | 1.63 | 0.4 | 6.6 | 0.51 | 0.44 | 0.48 | 92.92 |
| 323 | 53.3 | 1.46 | 23.41 | 12 | 1.49 | 0.41 | 5.45 | 2.13 | 0.19 | 0.16 | 94.39 |
| 324 | 53.19 | 1.51 | 23.46 | 11.98 | 1.61 | 0.44 | 5.08 | 1.56 | 0.56 | 0.61 | 94.31 |
| 325 | 53.56 | 1.53 | 23.18 | 11.74 | 1.69 | 0.45 | 5.45 | 0.63 | 0.85 | 0.92 | 93.63 |
| 326 | 53.01 | 1.47 | 23.6 | 12.23 | 1.4 | 0.43 | 4.36 | 2.73 | 0.43 | 0.34 | 95.3 |
| 327 | 52.8 | 1.52 | 23.72 | 12.22 | 1.52 | 0.47 | 4 | 2.19 | 0.79 | 0.79 | 95.23 |
| 328 | 52.84 | 1.57 | 23.66 | 12.13 | 1.64 | 0.49 | 3.96 | 1.63 | 1.01 | 1.08 | 94.97 |
| 329 | 53.22 | 1.59 | 23.36 | 11.89 | 1.74 | 0.49 | 4.3 | 0.71 | 1.3 | 1.39 | 94.3 |
| 330 | 53.05 | 1.53 | 23.56 | 12.36 | 1.32 | 0.44 | 3.26 | 3.7 | 0.44 | 0.36 | 96.4 |
| 331 | 53.45 | 1.62 | 23.25 | 12.37 | 1.32 | 0.45 | 2.52 | 4.62 | 0.21 | 0.2 | 97.29 |
| 332 | 52.54 | 1.59 | 23.65 | 12.35 | 1.36 | 0.46 | 3.63 | 2.99 | 0.79 | 0.81 | 96.67 |
| 333 | 54.18 | 1.74 | 22.69 | 12.34 | 1.35 | 0.47 | 1.58 | 5.57 | 0.03 | 0.06 | 98.37 |
| 334 | 53.38 | 1.68 | 23.24 | 12.32 | 1.36 | 0.46 | 1.8 | 4.54 | 0.57 | 0.65 | 97.55 |
| 335 | 52.93 | 1.65 | 23.53 | 12.28 | 1.38 | 0.46 | 1.88 | 3.79 | 1 | 1.1 | 97.02 |
| 336 | 55.43 | 1.86 | 21.76 | 12.21 | 1.39 | 0.49 | 0.07 | 6.81 | 0 | 0 | 99.95 |
| 337 | 54.59 | 1.82 | 22.32 | 12.24 | 1.39 | 0.48 | 0.36 | 5.73 | 0.51 | 0.58 | 99.08 |
| 338 | 53.98 | 1.78 | 22.73 | 12.2 | 1.39 | 0.47 | 0.6 | 4.95 | 0.89 | 1.01 | 98.39 |
| 339 | 53.5 | 1.74 | 23.04 | 12.14 | 1.39 | 0.46 | 0.77 | 4.18 | 1.32 | 1.45 | 97.77 |
| 340 | 52.8 | 1.51 | 23.72 | 12.33 | 1.38 | 0.45 | 3.46 | 2.99 | 0.72 | 0.65 | 95.9 |
| 341 | 52.64 | 1.54 | 23.8 | 12.29 | 1.49 | 0.47 | 3.39 | 2.4 | 1 | 0.99 | 95.63 |
| 342 | 52.65 | 1.58 | 23.75 | 12.21 | 1.61 | 0.5 | 3.31 | 1.84 | 1.25 | 1.3 | 95.39 |
| 343 | 52.83 | 1.62 | 23.58 | 12.08 | 1.71 | 0.52 | 3.25 | 1.21 | 1.56 | 1.64 | 95.11 |
| 344 | 52.66 | 1.59 | 23.77 | 12.34 | 1.39 | 0.46 | 2.72 | 3.11 | 1 | 0.99 | 96.3 |
| 345 | 52.53 | 1.59 | 23.81 | 12.28 | 1.48 | 0.48 | 2.61 | 2.47 | 1.37 | 1.39 | 96.01 |
| 346 | 52.59 | 1.62 | 23.7 | 12.19 | 1.58 | 0.51 | 2.47 | 1.84 | 1.74 | 1.77 | 95.77 |
| 347 | 52.69 | 1.62 | 23.68 | 12.27 | 1.4 | 0.46 | 2.08 | 3.26 | 1.23 | 1.3 | 96.61 |
| 348 | 52.6 | 1.63 | 23.66 | 12.18 | 1.46 | 0.48 | 1.94 | 2.53 | 1.73 | 1.77 | 96.27 |
| 349 | 52.93 | 1.68 | 23.43 | 12.14 | 1.4 | 0.46 | 1.38 | 3.36 | 1.55 | 1.66 | 96.95 |
| 350 | 53.02 | 1.64 | 23.37 | 11.96 | 1.74 | 0.53 | 2.9 | 0.7 | 2.04 | 2.09 | 95 |
| 351 | 52.68 | 1.64 | 23.56 | 12.11 | 1.6 | 0.51 | 2.16 | 1.6 | 2.06 | 2.07 | 95.76 |
| 352 | 53.12 | 1.66 | 23.15 | 11.88 | 1.67 | 0.53 | 1.99 | 0.57 | 2.73 | 2.69 | 95.31 |
| 353 | 52.7 | 1.65 | 23.52 | 12.1 | 1.47 | 0.48 | 1.66 | 2.29 | 2.05 | 2.08 | 96.26 |
| 354 | 52.92 | 1.66 | 23.25 | 11.95 | 1.52 | 0.5 | 1.43 | 1.5 | 2.66 | 2.61 | 95.96 |
| 355 | 53.41 | 1.67 | 22.76 | 11.71 | 1.57 | 0.51 | 1.17 | 0.38 | 3.5 | 3.32 | 95.51 |
| 356 | 53.18 | 1.7 | 23.16 | 11.99 | 1.4 | 0.46 | 0.8 | 3.11 | 2.06 | 2.13 | 97.06 |
| 357 | 53.23 | 1.69 | 23 | 11.85 | 1.41 | 0.46 | 0.64 | 2.24 | 2.76 | 2.72 | 96.64 |
| 358 | 53.49 | 1.68 | 22.67 | 11.69 | 1.42 | 0.47 | 0.38 | 1.34 | 3.53 | 3.35 | 96.29 |
| 359 | 54 | 1.67 | 22.15 | 11.44 | 1.43 | 0.47 | 0.06 | 0.1 | 4.52 | 4.16 | 95.78 |
| 360 | 56.43 | 3.39 | 18.55 | 12.41 | 4.37 | 0 | 0 | 4.86 | 0 | 0 | 100.01 |
| 361 | 56.17 | 3.39 | 18.58 | 12.61 | 4.17 | 0 | 0 | 4.2 | 0.88 | 0 | 100 |
| 362 | 56.33 | 3.32 | 18.57 | 13.11 | 4.16 | 0 | 0 | 4.23 | 0.27 | 0 | 99.99 |
| 363 | 56.02 | 3.41 | 18.61 | 12.82 | 4.07 | 0 | 0 | 3.71 | 1.35 | 0 | 99.99 |
| 364 | 56.18 | 3.3 | 18.55 | 13.4 | 3.97 | 0 | 0 | 3.58 | 1.03 | 0 | 100.01 |
| 365 | 56.26 | 3.26 | 18.61 | 13.66 | 3.99 | 0 | 0 | 3.76 | 0.47 | 0 | 100.01 |
| 366 | 55.93 | 3.45 | 18.59 | 13.02 | 4.05 | 0 | 0 | 3.25 | 1.69 | 0 | 99.98 |

TABLE II-continued

| Example No. | SiO$_2$ | B$_2$O$_3$ | Al$_2$O$_3$ | Li$_2$O | Na$_2$O | K$_2$O | MgO | CaO | SrO | BaO | SiO$_2$ + B$_2$O$_3$ + Al$_2$O$_3$ + SrO + Li$_2$O + Na$_2$O + K$_2$O |
|---|---|---|---|---|---|---|---|---|---|---|---|
| 367 | 56.21 | 3.3 | 18.45 | 13.71 | 3.93 | 0 | 0 | 3.1 | 1.3 | 0 | 100 |
| 368 | 56.28 | 3.22 | 18.47 | 14.06 | 3.84 | 0 | 0 | 3.1 | 1.03 | 0 | 100 |
| 369 | 56.24 | 3.21 | 18.63 | 14.23 | 3.84 | 0 | 0 | 3.28 | 0.59 | 0 | 100.02 |
| 370 | 55.83 | 3.51 | 18.5 | 13.06 | 4.05 | 0 | 0 | 2.7 | 2.36 | 0 | 100.01 |
| 371 | 55.67 | 3.54 | 18.41 | 13.04 | 4.02 | 0 | 0 | 2.28 | 3.03 | 0 | 99.99 |
| 372 | 56.14 | 3.38 | 18.27 | 13.68 | 3.96 | 0 | 0 | 2.3 | 2.26 | 0 | 99.99 |
| 373 | 55.43 | 3.59 | 18.36 | 13.17 | 4 | 0 | 0 | 1.79 | 3.65 | 0 | 99.99 |
| 374 | 55.88 | 3.45 | 18.27 | 13.56 | 3.95 | 0 | 0 | 1.88 | 3.01 | 0 | 100 |
| 375 | 56.24 | 3.32 | 18.18 | 14 | 3.91 | 0 | 0 | 1.91 | 2.45 | 0 | 100.01 |
| 376 | 55.11 | 3.67 | 18.36 | 13.47 | 3.98 | 0 | 0 | 1.08 | 4.32 | 0 | 99.99 |
| 377 | 55.44 | 3.56 | 18.3 | 13.78 | 3.94 | 0 | 0 | 1.19 | 3.79 | 0 | 100 |
| 378 | 55.76 | 3.46 | 18.26 | 13.99 | 3.91 | 0 | 0 | 1.27 | 3.36 | 0 | 100.01 |
| 379 | 56.08 | 3.35 | 18.23 | 14.28 | 3.87 | 0 | 0 | 1.33 | 2.87 | 0 | 100.01 |
| 380 | 56.07 | 3.41 | 18.44 | 13.46 | 4 | 0 | 0 | 2.82 | 1.79 | 0 | 99.99 |
| 381 | 56.32 | 3.28 | 18.34 | 14.01 | 3.91 | 0 | 0 | 2.8 | 1.34 | 0 | 100 |
| 382 | 56.4 | 3.19 | 18.35 | 14.41 | 3.81 | 0 | 0 | 2.79 | 1.04 | 0 | 99.99 |
| 383 | 56.33 | 3.16 | 18.5 | 14.68 | 3.74 | 0 | 0 | 2.79 | 0.8 | 0 | 100 |
| 384 | 56.31 | 3.32 | 18.24 | 13.96 | 3.94 | 0 | 0 | 2.41 | 1.81 | 0 | 99.99 |
| 385 | 56.56 | 3.2 | 18.16 | 14.57 | 3.85 | 0 | 0 | 2.37 | 1.28 | 0 | 99.99 |
| 386 | 56.58 | 3.14 | 18.24 | 15.02 | 3.76 | 0 | 0 | 2.33 | 0.92 | 0 | 99.99 |
| 387 | 56.45 | 3.26 | 18.13 | 14.29 | 3.89 | 0 | 0 | 2.02 | 1.96 | 0 | 100 |
| 388 | 56.66 | 3.17 | 18.11 | 14.92 | 3.82 | 0 | 0 | 1.97 | 1.35 | 0 | 100 |
| 389 | 56.43 | 3.25 | 18.16 | 14.53 | 3.85 | 0 | 0 | 1.62 | 2.17 | 0 | 100.01 |
| 390 | 56.27 | 3.17 | 18.63 | 15.07 | 3.7 | 0 | 0 | 2.63 | 0.54 | 0 | 100.01 |
| 391 | 56.57 | 3.14 | 18.3 | 15.3 | 3.72 | 0 | 0 | 2.17 | 0.78 | 0 | 99.98 |
| 392 | 56.29 | 3.2 | 18.67 | 15.68 | 3.67 | 0 | 0 | 2.14 | 0.35 | 0 | 100 |
| 393 | 56.67 | 3.16 | 18.16 | 15.2 | 3.79 | 0 | 0 | 1.81 | 1.22 | 0 | 100.01 |
| 394 | 56.56 | 3.18 | 18.36 | 15.71 | 3.72 | 0 | 0 | 1.73 | 0.72 | 0 | 99.98 |
| 395 | 56.24 | 3.27 | 18.78 | 16.22 | 3.69 | 0 | 0 | 1.65 | 0.16 | 0 | 100.01 |
| 396 | 56.41 | 3.26 | 18.25 | 14.9 | 3.82 | 0 | 0 | 1.31 | 2.07 | 0 | 100.02 |
| 397 | 56.47 | 3.25 | 18.36 | 15.51 | 3.78 | 0 | 0 | 1.23 | 1.4 | 0 | 100 |
| 398 | 56.36 | 3.3 | 18.59 | 16.12 | 3.75 | 0 | 0 | 1.13 | 0.76 | 0 | 100.01 |
| 399 | 56.08 | 3.4 | 18.99 | 16.8 | 3.73 | 0 | 0 | 1 | 0 | 0 | 100 |
| 400 | 51.22 | 0 | 22.05 | 13.67 | 4.18 | 0 | 0.12 | 8.7 | 0 | 0 | 99.82 |
| 401 | 51.02 | 0 | 21.93 | 13.81 | 4.21 | 0 | 0.11 | 7.39 | 1.45 | 0 | 99.81 |
| 402 | 51.15 | 0 | 22.08 | 14.69 | 4.29 | 0 | 0.11 | 7.65 | 0 | 0 | 99.86 |
| 403 | 50.94 | 0 | 21.75 | 13.99 | 4.15 | 0 | 0.1 | 6.39 | 2.59 | 0 | 99.81 |
| 404 | 51.02 | 0 | 21.88 | 14.87 | 4.26 | 0 | 0.1 | 6.29 | 1.49 | 0 | 99.81 |
| 405 | 51.13 | 0 | 22.07 | 15.48 | 4.36 | 0 | 0.1 | 6.81 | 0 | 0 | 99.85 |
| 406 | 50.89 | 0 | 21.55 | 14.14 | 4.06 | 0 | 0.1 | 5.43 | 3.73 | 0 | 99.8 |
| 407 | 51.01 | 0 | 21.66 | 15.07 | 4.15 | 0 | 0.09 | 5.28 | 2.64 | 0 | 99.81 |
| 408 | 51.09 | 0 | 21.81 | 15.72 | 4.26 | 0 | 0.09 | 5.42 | 1.52 | 0 | 99.82 |
| 409 | 51.16 | 0 | 22.02 | 16.34 | 4.4 | 0 | 0.09 | 5.91 | 0 | 0 | 99.83 |
| 410 | 50.77 | 0 | 21.42 | 14.01 | 4.01 | 0 | 0.09 | 4.29 | 5.3 | 0 | 99.8 |
| 411 | 50.62 | 0 | 21.39 | 13.71 | 4.03 | 0 | 0.07 | 3.45 | 6.6 | 0 | 99.8 |
| 412 | 50.88 | 0 | 21.44 | 14.87 | 4.05 | 0 | 0.07 | 3.56 | 5.01 | 0 | 99.81 |
| 413 | 50.45 | 0 | 21.34 | 13.44 | 4.04 | 0 | 0.06 | 2.49 | 8.04 | 0 | 99.8 |
| 414 | 50.71 | 0 | 21.41 | 14.56 | 4.07 | 0 | 0.06 | 2.67 | 6.4 | 0 | 99.82 |
| 415 | 50.94 | 0 | 21.45 | 15.46 | 4.08 | 0 | 0.06 | 2.74 | 5.16 | 0 | 99.83 |
| 416 | 50.29 | 0 | 21.21 | 13.19 | 4.02 | 0 | 0.05 | 1.06 | 10.01 | 0 | 99.78 |
| 417 | 50.49 | 0 | 21.3 | 14.26 | 4.06 | 0 | 0.05 | 1.24 | 8.46 | 0 | 99.81 |
| 418 | 50.69 | 0 | 21.36 | 15.11 | 4.08 | 0 | 0.04 | 1.37 | 7.21 | 0 | 99.82 |
| 419 | 50.95 | 0 | 21.41 | 16.03 | 4.09 | 0 | 0.04 | 1.45 | 5.92 | 0 | 99.85 |
| 420 | 50.91 | 0 | 21.48 | 14.61 | 4.04 | 0 | 0.09 | 4.61 | 4.15 | 0 | 99.8 |
| 421 | 51.04 | 0 | 21.58 | 15.37 | 4.11 | 0 | 0.09 | 4.68 | 3.03 | 0 | 99.81 |
| 422 | 51.15 | 0 | 21.7 | 16.07 | 4.21 | 0 | 0.09 | 4.77 | 1.92 | 0 | 99.82 |
| 423 | 51.23 | 0 | 21.84 | 16.78 | 4.32 | 0 | 0.08 | 4.87 | 0.8 | 0 | 99.84 |
| 424 | 50.99 | 0 | 21.47 | 15.26 | 4.05 | 0 | 0.08 | 3.84 | 4.21 | 0 | 99.82 |
| 425 | 51.17 | 0 | 21.52 | 16.11 | 4.09 | 0 | 0.08 | 3.84 | 3.08 | 0 | 99.81 |
| 426 | 51.32 | 0 | 21.61 | 16.94 | 4.16 | 0 | 0.08 | 3.84 | 1.97 | 0 | 99.84 |
| 427 | 51.08 | 0 | 21.47 | 15.88 | 4.07 | 0 | 0.06 | 3.03 | 4.31 | 0 | 99.84 |
| 428 | 51.32 | 0 | 21.48 | 16.84 | 4.08 | 0 | 0.06 | 2.97 | 3.16 | 0 | 99.85 |
| 429 | 51.18 | 0 | 21.45 | 16.54 | 4.08 | 0 | 0.05 | 2.12 | 4.48 | 0 | 99.85 |
| 430 | 51.34 | 0 | 21.88 | 17.62 | 4.36 | 0 | 0.08 | 4.59 | 0.05 | 0 | 99.84 |
| 431 | 51.44 | 0 | 21.6 | 17.51 | 4.16 | 0 | 0.07 | 3.52 | 1.62 | 0 | 99.85 |

TABLE II-continued

| Example No. | SiO$_2$ | B$_2$O$_3$ | Al$_2$O$_3$ | Li$_2$O | Na$_2$O | K$_2$O | MgO | CaO | SrO | BaO | SiO$_2$ + B$_2$O$_3$ + Al$_2$O$_3$ + SrO + Li$_2$O + Na$_2$O + K$_2$O |
|---|---|---|---|---|---|---|---|---|---|---|---|
| 432 | 51.57 | 0 | 21.72 | 18.66 | 4.26 | 0 | 0.07 | 3.51 | 0.12 | 0 | 99.84 |
| 433 | 51.46 | 0 | 21.47 | 17.42 | 4.07 | 0 | 0.06 | 2.61 | 2.82 | 0 | 99.85 |
| 434 | 51.67 | 0 | 21.48 | 18.43 | 4.08 | 0 | 0.06 | 2.48 | 1.72 | 0 | 99.86 |
| 435 | 51.84 | 0 | 21.55 | 19.75 | 4.14 | 0 | 0.06 | 2.36 | 0.21 | 0 | 99.85 |
| 436 | 51.35 | 0 | 21.41 | 17.39 | 4.06 | 0 | 0.04 | 1.4 | 4.25 | 0 | 99.86 |
| 437 | 51.68 | 0 | 21.37 | 18.52 | 4.01 | 0 | 0.05 | 1.22 | 3.08 | 0 | 99.88 |
| 438 | 51.95 | 0 | 21.32 | 19.69 | 3.97 | 0 | 0.05 | 0.98 | 1.95 | 0 | 99.86 |
| 439 | 52.15 | 0 | 21.33 | 21.23 | 3.99 | 0 | 0.06 | 0.74 | 0.42 | 0 | 99.86 |

Substrates were formed from compositions of Table I, and subsequently ion exchanged to form example articles. The ion exchange included submerging the substrates into a molten salt bath for the times reported in Table III below. The salt bath had the composition (in terms of nitrate salts) and temperature as reported in Table III below. The maximum central tension (CT) were measured according to the methods described herein and is reported in Table III.

TABLE III

| Article | 1 | 2 | 3 | 4 | 5 | 6 |
|---|---|---|---|---|---|---|
| Composition | G | H | I | J | K | L |
| Temperature (° C.) | 460 | 460 | 460 | 460 | 460 | 460 |
| Time (hours) | 8 | 8 | 8 | 8 | 8 | 8 |
| Bath Composition | 90% K 10% Na | 90% K 10% Na | 90% K 10% Na | 90% K 10% Na | 90% K 10% Na | 90% K 10% Na |
| CT (MPa) | 50.7 | 52.4 | 56.3 | 42.9 | 46.8 | 34.6 |

| Article | 7 | 8 | 9 | 10 | 11 | 12 |
|---|---|---|---|---|---|---|
| Composition | G | H | I | J | K | L |
| Temperature (° C.) | 460 | 460 | 460 | 460 | 460 | 460 |
| Time (hours) | 16 | 16 | 16 | 16 | 16 | 16 |
| Bath Composition | 90% K 10% Na | 90% K 10% Na | 90% K 10% Na | 90% K 10% Na | 90% K 10% Na | 90% K 10% Na |
| CT (MPa) | 68.2 | 68 | 72.1 | 61.8 | 72.9 | 65.5 |

| Article | 13 | 14 | 15 | 16 | 17 | 18 |
|---|---|---|---|---|---|---|
| Composition | G | H | I | J | K | L |
| Temperature (° C.) | 460 | 460 | 460 | 460 | 460 | 460 |
| Time (hours) | 32 | 32 | 32 | 32 | 32 | 32 |
| Bath Composition | 90% K 10% Na | 90% K 10% Na | 90% K 10% Na | 90% K 10% Na | 90% K 10% Na | 90% K 10% Na |
| CT (MPa) | 84.3 | 80 | 88.5 | 79.3 | 85.9 | 74 |

| Article | 19 | 20 | 21 | 22 | 23 | 24 |
|---|---|---|---|---|---|---|
| Composition | M | N | O | P | Q | R |
| Temperature (° C.) | 400 | 400 | 400 | 400 | 400 | 400 |
| Time (hours) | 4 | 4 | 4 | 4 | 4 | 4 |
| Bath Composition | 100% Na | 100% Na | 100% Na | 100% Na | 100% Na | 100% Na |
| CT (MPa) | 55.3 | 58.7 | 60.3 | 78.1 | 87.2 | 102.3 |

TABLE III-continued

| Article | 25 | 26 | 27 | 28 | 29 | 30 |
|---|---|---|---|---|---|---|
| Composition | M | N | O | P | Q | R |
| Temperature (° C.) | 400 | 400 | 400 | 400 | 400 | 400 |
| Time (hours) | 8 | 8 | 8 | 8 | 8 | 8 |
| Bath Composition | 100% Na | 100% Na | 100% Na | 100% Na | 100% Na | 100% Na |
| CT (MPa) | 72.4 | 79 | 80.9 | 108.4 | 122.6 | 135.7 |

| Article | 31 | 32 | 33 | 34 | 35 | 36 |
|---|---|---|---|---|---|---|
| Composition | M | N | O | P | Q | R |
| Temperature (° C.) | 400 | 400 | 400 | 400 | 400 | 400 |
| Time (hours) | 16 | 16 | 16 | 16 | 16 | 16 |
| Bath Composition | 100% Na | 100% Na | 100% Na | 100% Na | 100% Na | 100% Na |
| CT (MPa) | 112.3 | 114 | 110.3 | 161.8 | 177.8 | 195.5 |

| Article | 37 | 38 | 39 | 40 | 41 | 42 |
|---|---|---|---|---|---|---|
| Composition | M | N | O | P | Q | R |
| Temperature (° C.) | 460 | 460 | 460 | 460 | 460 | 460 |
| Time (hours) | 8 | 8 | 8 | 8 | 8 | 8 |
| Bath Composition | 90% K 10% Na | 90% K 10% Na | 90% K 10% Na | 90% K 10% Na | 90% K 10% Na | 90% K 10% Na |
| CT (MPa) | 138.5 | 154.1 | 169.1 | 145.5 | 148.3 | 168.4 |

| Article | 43 | 44 | 45 | 46 | 47 | 48 |
|---|---|---|---|---|---|---|
| Composition | M | N | O | P | Q | R |
| Temperature (° C.) | 460 | 460 | 460 | 460 | 460 | 460 |
| Time (hours) | 16 | 16 | 16 | 16 | 16 | 16 |
| Bath Composition | 90% K 10% Na | 90% K 10% Na | 90% K 10% Na | 90% K 10% Na | 90% K 10% Na | 90% K 10% Na |
| CT (MPa) | 181 | 204.4 | 203.2 | 204.1 | 193.3 | 204 |

| Article | 49 | 50 | 51 | 52 | 53 | 54 |
|---|---|---|---|---|---|---|
| Composition | M | N | O | P | Q | R |
| Temperature (° C.) | 460 | 460 | 460 | 460 | 460 | 460 |
| Time (hours) | 32 | 32 | 32 | 32 | 32 | 32 |

TABLE III-continued

| Bath Composition | 90% K 10% Na | 90% K 10% Na | 90% K 10% Na | 90% K 10% Na | 90% K 10% Na | 90% K 10% Na |
|---|---|---|---|---|---|---|
| CT (MPa) | 211.8 | 195.2 | 159 | 217 | 215.1 | 175.4 |
| Article | 55 | 56 | 57 | 58 | 59 | 60 |
| Composition | Z | AA | BB | CC | DD | EE |
| Temperature (° C.) | 400 | 400 | 400 | 400 | 400 | 400 |
| Time (hours) | 4 | 4 | 4 | 4 | 4 | 4 |
| Bath Composition | 100% Na | 100% Na | 100% Na | 100% Na | 100% Na | 100% Na |
| CT (MPa) | 231.7 | 233.5 | 235.2 | 227.4 | 113.1 | 104 |
| Article | 61 | 62 | 63 | 64 | 65 | 66 |
| Composition | Z | AA | BB | CC | DD | EE |
| Temperature (° C.) | 400 | 400 | 400 | 400 | 400 | 400 |
| Time (hours) | 8 | 8 | 8 | 8 | 8 | 8 |
| Bath Composition | 100% Na | 100% Na | 100% Na | 100% Na | 100% Na | 100% Na |
| CT (MPa) | 193 | 192.7 | 204.3 | 264.8 | 158.9 | 150.2 |
| Article | 67 | 68 | 69 | 70 | 71 | 72 |
| Composition | Z | AA | BB | CC | DD | EE |
| Temperature (° C.) | 400 | 400 | 400 | 400 | 400 | 400 |
| Time (hours) | 16 | 16 | 16 | 16 | 16 | 16 |
| Bath Composition | 100% Na | 100% Na | 100% Na | 100% Na | 100% Na | 100% Na |
| CT (MPa) | 127.4 | 125.1 | 129.1 | 201.6 | 212.1 | 196.7 |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-based article, comprising:
   a compressive stress region extending from a surface to a depth of compression;
   a maximum central tension of greater than or equal to 150 MPa;
   a composition at a center of the glass-based article comprising:
      greater than or equal to 30 mol % $SiO_2$;
      less than or equal to 25 mol % $Li_2O$;
      from greater than or equal to 0 mol % to less than or equal to 17 mol % CaO;
      greater than or equal to 1 mol % SrO;
      from greater than or equal to 0 mol % to less than or equal to 3 mol % $K_2O$; and
      from greater than or equal to 0.5 mol % to less than or equal to 5 mol % $B_2O_3$.

2. The glass-based article of claim 1, wherein the composition at the center comprises from greater than or equal to 0.5 mol % to less than or equal to 5 mol % $B_2O_3$ and from greater than or equal to 4.0 mol % to less than or equal to 9.0 mol % $Na_2O$.

3. The glass-based article of claim 1, wherein the composition at the center comprises at least one of:
   from greater than or equal to 30 mol % to less than or equal to 57.5 mol % $SiO_2$; or
   from greater than or equal to 10 mol % to less than or equal to 25 mol % $Li_2O$.

4. The glass-based article of claim 1, wherein the composition at the center is characterized by $SiO_2+B_2O_3+Al_2O_3+CaO+SrO+Li_2O+Na_2O+K_2O$ being greater than or equal to 99.7 mol %.

5. The glass-based article of claim 1, wherein the maximum central tension is greater than or equal to 200 MPa.

6. The glass-based article of claim 1, comprising a compressive stress of the compressive stress region of greater than or equal to 500 MPa.

7. The glass-based article of claim 1, wherein the depth of compression is greater than or equal to 0.15t, wherein t is a thickness of the glass-based article.

8. The glass-based article of claim 1, comprising a parabolic stress profile.

9. A consumer electronic product, comprising:
   a housing comprising a front surface, a back surface and side surfaces;
   electrical components at least partially within the housing, the electrical components comprising a controller, a memory, and a display, the display at or adjacent the front surface of the housing; and
   a cover disposed over the display,
   wherein at least a portion of at least one of the housing or the cover comprises the glass-based article of claim 1.

10. A method, comprising:
   contacting a glass-based substrate with an ion exchange salt to form a glass-based article;
   wherein:
      the glass-based article comprises a compressive stress region extending from a surface to a depth of compression and a maximum central tension of greater than or equal to 150 MPa;
      the ion exchange salt comprises sodium; and
      the glass-based substrate comprises:
         greater than or equal to 30 mol % $SiO_2$;
         less than or equal to 25 mol % $Li_2O$;
         from greater than or equal to 0 mol % to less than or equal to 17 mol % CaO;
         greater than or equal to 1 mol % SrO;
         from greater than or equal to 0 mol % to less than or equal to 3 mol % $K_2O$; and
         from greater than or equal to 0.5 mol % to less than or equal to 5 mol % $B_2O_3$.

11. The method of claim 10, wherein the glass-based substrate comprises from greater than or equal to 0.5 mol % to less than or equal to 5 mol % $B_2O_3$, and from greater than or equal to 4.0 mol % to less than or equal to 9.0 mol % $Na_2O$.

12. The method of claim 10, wherein the glass-based substrate comprises at least one of:
   from greater than or equal to 30 mol % to less than or equal to 57.5 mol % $SiO_2$; or
   from greater than or equal to 10 mol % to less than or equal to 25 mol % $Li_2O$.

13. The method of claim 10, wherein the glass-based substrate is characterized by $SiO_2+B_2O_3+Al_2O_3+CaO+SrO+Li_2O+Na_2O+K_2O$ being greater than or equal to 99.7 mol %.

14. The method of claim 10, wherein the maximum central tension is greater than or equal to 200 MPa.

15. The method of claim 10, wherein the compressive stress region comprises a compressive stress of greater than or equal to 500 MPa.

16. The method of claim 10, wherein the depth of compression is greater than or equal to 0.15t, wherein t is a thickness of the glass-based article.

17. The method of claim 10, wherein the glass-based article comprises a parabolic stress profile.

18. A glass, comprising:
   greater than or equal to 30 mol % $SiO_2$;
   less than or equal to 25 mol % $Li_2O$;
   from greater than or equal to 0.5 mol % to less than or equal to 17 mol % CaO;
   greater than or equal to 1 mol % SrO;
   from greater than or equal to 0 mol % to less than or equal to 3 mol % $K_2O$;
   from greater than or equal to 0.5 mol % to less than or equal to 5 mol % $B_2O_3$; and
   at least one of:
      from greater than or equal to 30 mol % to less than or equal to 57.5 mol % $SiO_2$;
      greater than or equal to 4.0 mol % $Na_2O$; or
      from greater than or equal to 10 mol % to less than or equal to 25 mol % $Li_2O$,
   wherein $SiO_2+B_2O_3+Al_2O_3+CaO+SrO+Li_2O+Na_2O+K_2O$ is greater than or equal to 99.7 mol %.

19. The glass-based article of claim 1, wherein the maximum central tension is greater than or equal to 260 MPa.

20. The glass of claim 1, wherein the maximum central tension is greater than or equal to 300 MPa.

* * * * *

UNITED STATES PATENT AND TRADEMARK OFFICE
CERTIFICATE OF CORRECTION

| | | |
|---|---|---|
| PATENT NO. | : 12,371,365 B2 | Page 1 of 1 |
| APPLICATION NO. | : 17/358961 | |
| DATED | : July 29, 2025 | |
| INVENTOR(S) | : Guo et al. | |

It is certified that error appears in the above-identified patent and that said Letters Patent is hereby corrected as shown below:

In the Claims

Claim 7, Column 44, Line 23, delete "wherein tis a" and insert -- wherein t is a --.

Signed and Sealed this
Ninth Day of December, 2025

John A. Squires
*Director of the United States Patent and Trademark Office*